United States Patent
Yang

(10) Patent No.: US 9,397,764 B2
(45) Date of Patent: Jul. 19, 2016

(54) CARRIER FREQUENCY OFFSET CALIBRATION METHOD AND SYSTEM

(71) Applicant: Novatek Microelectronics Corp., Hsinchu (TW)

(72) Inventor: Yuan-Hau Yang, Miaoli County (TW)

(73) Assignee: Novatek Microelectronics Corp., Hsinchu (TW)

( * ) Notice: Subject to any disclaimer, the term of this patent is extended or adjusted under 35 U.S.C. 154(b) by 177 days.

(21) Appl. No.: 14/156,459

(22) Filed: Jan. 16, 2014

(65) Prior Publication Data

US 2015/0126127 A1 May 7, 2015

(30) Foreign Application Priority Data

Nov. 1, 2013 (TW) .............................. 102139740 A

(51) Int. Cl.
*H04B 17/00* (2015.01)
*H04B 17/10* (2015.01)
*H04B 17/14* (2015.01)

(52) U.S. Cl.
CPC .......... *H04B 17/0005* (2013.01); *H04B 17/104* (2015.01); *H04B 17/14* (2015.01)

(58) Field of Classification Search
CPC ..... H04B 17/005; H04B 17/104; H04B 17/14
USPC .............. 455/62, 63.1, 67.7, 67.13, 71, 67.14
See application file for complete search history.

(56) References Cited

U.S. PATENT DOCUMENTS

| 8,654,885 | B2 | 2/2014 | Lee et al. | |
| 2003/0118120 | A1 | 6/2003 | Menkhoff et al. | |
| 2004/0032854 | A1 | 2/2004 | Huang et al. | |
| 2006/0023823 | A1* | 2/2006 | Sun et al. | 375/362 |
| 2008/0025381 | A1 | 1/2008 | Lee et al. | |
| 2013/0202069 | A1* | 8/2013 | Nilsson et al. | 375/343 |

FOREIGN PATENT DOCUMENTS

| CN | 101232485 | 7/2008 |
| JP | 2006033270 | 2/2006 |
| TW | 200814653 | 3/2008 |
| TW | 201105078 | 2/2011 |

OTHER PUBLICATIONS

"Office Action of Taiwan Counterpart Application", issued on Dec. 15, 2015, p. 1-p. 4.

* cited by examiner

*Primary Examiner* — Yuwen Pan
*Assistant Examiner* — Xin Jia
(74) *Attorney, Agent, or Firm* — Jianq Chyun IP Office

(57) ABSTRACT

A carrier frequency offset calibration method and a carrier frequency offset calibration system are provided. The carrier frequency offset calibration method is adapted to calibrate the carrier frequency offsets of a transmission signal which includes a primary carrier and a secondary carrier. In the carrier frequency offset calibration method, the transmission signal is analyzed according to known carrier frequencies, a primary feedback value and a secondary feedback value, so as to obtain a primary carrier offset value and a secondary carrier offset value. The relationship between the primary carrier offset value and the secondary offset value is considered to determine whether to adjust the primary feedback signal and the secondary feedback signal.

24 Claims, 18 Drawing Sheets

CARRIER FREQUENCY OFFSET CALIBRATION METHOD AND SYSTEM

CROSS-REFERENCE TO RELATED APPLICATION

This application claims the priority benefit of Taiwan application serial no. 102139740, filed on Nov. 1, 2013. The entirety of the above-mentioned patent application is hereby incorporated by reference herein and made a part of this specification.

BACKGROUND

1. Field of the Invention

The invention is directed to a communication apparatus and more particularly, to a carrier frequency offset calibration method and a carrier frequency offset calibration system.

2. Description of Related Art

A2 stereo system is an analog audio transmission system used in broadcast television systems. Specifically, in order to satisfy users using different languages or to provide a stereo service, during transmission process, many TV programs transmit a format containing two sets of signals (i.e., a primary channel signal and a secondary channel signal) for the users to choose. That is, besides a primary carrier carrying the primary channel audio signal a secondary carrier carrying the secondary channel signal is also provided to achieve a dual sound system. Alternatively, in order to provide the stereo services, audio signals from the left and the right channels are mixed and then respectively transmitted by the primary carrier and the secondary carrier. Generally, frequencies of the primary carrier and the secondary carrier are separated from each other on the spectrum. When receiving a transmission signal, a receiving terminal circuit obtains a primary channel signal and a secondary channel signal according to a known carrier frequency and demodulates the same, respectively, such that a primary channel audio signal and a secondary channel audio signal are obtained, or alternatively, the primary carrier and the secondary carrier are demodulated, remixed to obtain stereo audio signals of the left and the right channels.

However, offsets may occur in frequencies of the carriers of the transmission signal received by the receiving terminal circuit due to discrepancies in the system (i.e., discrepancies between the transmission terminal and the receiving terminal) or affections to the transmission process from the environment, which further results in error occurring when demodulating of the primary channel signal and the secondary channel signal. FIGS. 1A to 1B are schematic diagrams showing a carrier frequency offset. With reference to FIG. 1A and FIG. 1B, carrier frequencies (i.e., center frequencies) of a primary channel signal $S_0$ and a secondary channel signal $S_1$ sent by a transmission terminal circuit are a carrier frequency $f_{c0}$ and a carrier frequency $f_{c1}$, respectively. However, after the signals are transmitted to a receiving terminal circuit, as shown in FIG. 1B, a carrier frequency offset may probably occur between the primary carrier and the secondary carrier, such that the carrier frequencies (i.e., the center frequencies) of the primary channel signal $S_{0'}$ and the secondary channel signal $S_1$ at the receiving terminal are shifted to $f_{c0'}$ and $f_{c1'}$.

In order to avoid the aforementioned situation that the carrier frequency offsets may cause affection to the demodulation of the transmission signal S, a conventional technique utilizes a feedback method for calibrating the carrier frequency offset. FIG. 2 is a schematic diagram illustrating a carrier frequency offset calibration system 100 commonly seen in the conventional art. With reference to FIG. 2 and taking the carrier frequency offset illustrated in FIGS. 1A and 1B for example, the carrier frequency offset calibration system 100 include a standard detector 120, a demodulation apparatus 140 and a demodulation apparatus 160. After the carrier frequency offset calibration system 100 receives a transmission signal S, the standard detector 120 detects which communication protocol that the transmission signal S belongs to and respectively provide a known primary carrier frequency and a known secondary carrier frequency (i.e., standard carrier frequencies, such as the center frequencies $f_{c0}$ and $f_{c1}$) belonging to the communication protocol to the demodulation apparatus 140 and the demodulation apparatus 160, and the demodulation apparatus 140 and the demodulation apparatus 160 respectively receive the transmission signal S.

The demodulation apparatus 140 calculates an offset between a primary carrier frequency $f_{c0'}$ of an actual primary channel signal $S_{0'}$ and the known primary carrier frequency (i.e., the center frequency $f_{c0}$) of the primary channel according to the known primary carrier frequency using a mixer 142, a low-pass filter 144 and a carrier offset calculator 148 and serves the offset as a primary carrier offset value $f^0_{nos}$, as shown in FIG. 1B. Then, the primary carrier offset value $f^0_{nos}$ is re-fed back to the mixer 142 of the demodulation apparatus 140 to calibrating the carrier frequencies of the transmission signal S and demodulate the transmission signal S using the low-pass filter 144 and a frequency modulation (FM) demodulator 146 to correctly obtain the primary channel signal $S_{0'}$ (having the center frequency $f_{c0'}$). The demodulation apparatus 160 utilizes the similar method to calculate an offset between a secondary carrier frequency fc1' of an actual secondary channel signal $S_1$, and the known secondary carrier frequency (i.e., the center frequency $f_{c1}$) of the secondary channel according to the known secondary carrier frequency $f_{c1}$ using a mixer 162, a low-pass filter 164 and a carrier offset calculator 168 and serve the offset as a secondary carrier offset value $f^1_{nos}$, as shown in FIG. 1B. Thereafter, the secondary carrier offset value $f^1_{nos}$ is re-fed back to the mixer 162 of the demodulation apparatus 160 to demodulate the transmission signal S to correctly obtain the secondary channel signal $S_1$, (having the carrier center frequency $f_{c1'}$).

In the carrier frequency offset calibration system 100 illustrated in FIG. 2, the demodulation apparatus 140 and the demodulation apparatus 160 separately calibrate and demodulate the carrier frequency offset of the transmission signal S. However, the carrier frequency offset calibration system 100 can not be applied to all carrier frequency offset situations. FIGS. 1C to 1D are schematic diagrams of two types of carrier frequency offsets. With reference to FIGS. 1A and 1C, if, on the spectrum, the secondary channel signal $S_1$, received by the receiving terminal circuit is more adjacent to the primary channel signal $S_0$ output by the transmission terminal circuit than the primary channel signal $S_{0'}$ received by the receiving terminal circuit due to the carrier frequency offset, the demodulation apparatus 140 may likely identify the secondary channel signal $S_1$, as the primary channel signal $S_0$ and demodulate due to carrier frequency calibration, and as a result, the audio signal carried on the primary channel signal $S_{0'}$ is lost.

In contrary, with reference to FIGS. 1A and 1D, if, on the spectrum, the primary channel signal $S_{0'}$ received by the receiving terminal circuit is more adjacent to the secondary channel signal $S_1$ output by the transmission terminal circuit than the secondary channel signal $S_1$, received by the receiving terminal circuit due to the carrier frequency offset, the demodulation apparatus 160 may likely identify the primary channel signal $S_0$, as the secondary channel signal $S_1$ and demodulate in the demodulation process, and as a result, the audio signal carried on the secondary channel signal $S_1$, is lost. In view of the foregoing, how to provide a more accurate carrier frequency offset calibration method and system to prevent the audio signals of the primary channel signal $S_0$, and the secondary channel signal $S_1$, received by the receiving terminal circuit from being lost due to carrier frequency offset during the demodulation process is still a major subject for persons of the art.

SUMMARY

The invention provides a carrier frequency offset calibration method capable of comparing situations of carrier frequency offsets between a primary carrier and a secondary carrier in a transmission signal so as to correctly calibrate a frequency of the transmission signal.

The invention provides a carrier frequency offset calibration system having a carrier offset coordinator to compare situations of carrier frequency offsets between a primary carrier and a secondary carrier and output corresponding feedback signals to a primary demodulation apparatus and a secondary demodulation apparatus so as to calibrate a frequency of the transmission signal.

The carrier frequency offset calibration method of the invention is adapted to the carrier frequency offset calibration system to calibrate carrier frequency offsets of a transmission signal having a primary carrier and a secondary carrier. The carrier frequency offset calibration method includes the following steps. A frequency of the transmission signal is analyzed according to a known primary carrier frequency, a known secondary carrier frequency, a primary feedback signal and a secondary feedback signal to obtain a primary carrier offset value and a secondary carrier offset value. Whether to adjust the primary feedback signal and the secondary feedback signal is determined according to a relationship between the primary carrier offset value and the secondary carrier offset value.

The carrier frequency offset calibration system of the invention is adapted to calibrate carrier frequency offsets of a transmission signal having a primary carrier and a secondary carrier. The carrier frequency offset calibration system includes a standard detector, a primary demodulation apparatus, a secondary demodulation apparatus and a carrier offset coordinator. The standard detector is configured to provide a known primary carrier frequency and a known secondary carrier frequency. The primary demodulation apparatus and the secondary demodulation apparatus are coupled to the standard detector and respectively analyze a frequency of the transmission signal according to the known primary carrier frequency and the primary feedback signal, the known secondary carrier frequency and the secondary feedback signal to obtain a primary carrier offset value and a secondary carrier offset value. The carrier offset coordinator is coupled to the primary demodulation apparatus and the secondary demodulation apparatus to receive the primary carrier offset value and the secondary carrier offset value and determines whether to adjust the primary feedback signal and the secondary feedback signal according to a relationship between the primary carrier offset value and the secondary carrier offset value.

Based on the above, in the carrier frequency offset calibration method and the carrier frequency offset calibration system provided by the invention, by calculating the carrier frequency offsets of the transmission signal, the primary carrier offset value and the secondary carrier offset value are obtained, and the frequency of the transmission signal is calibrated according to the primary carrier offset value and the secondary carrier offset value. In other words, the primary carrier offset value and the secondary carrier offset value are simultaneously served as a basis to calibrate the carrier frequencies of the transmission signal, such that the carrier frequency calibration operation can be correctly performed. According to other embodiments of the invention, in the carrier frequency offset calibration method and the carrier frequency offset calibration system, a plurality of parameters of the transmission signal, such as the carrier power levels, the mode indication symbols and the signal to noise ratios (SNRs), are further served as the basis to correctly perform the carrier frequency calibration operation.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The invention provides a carrier frequency offset calibration method and a carrier frequency offset calibration system adapted to calibrate carrier frequency offsets for signals received by a receiving terminal, which feature in calibrating the carrier frequency offsets by comparing signals on different bands and through a coordination manner.

Figure 2:
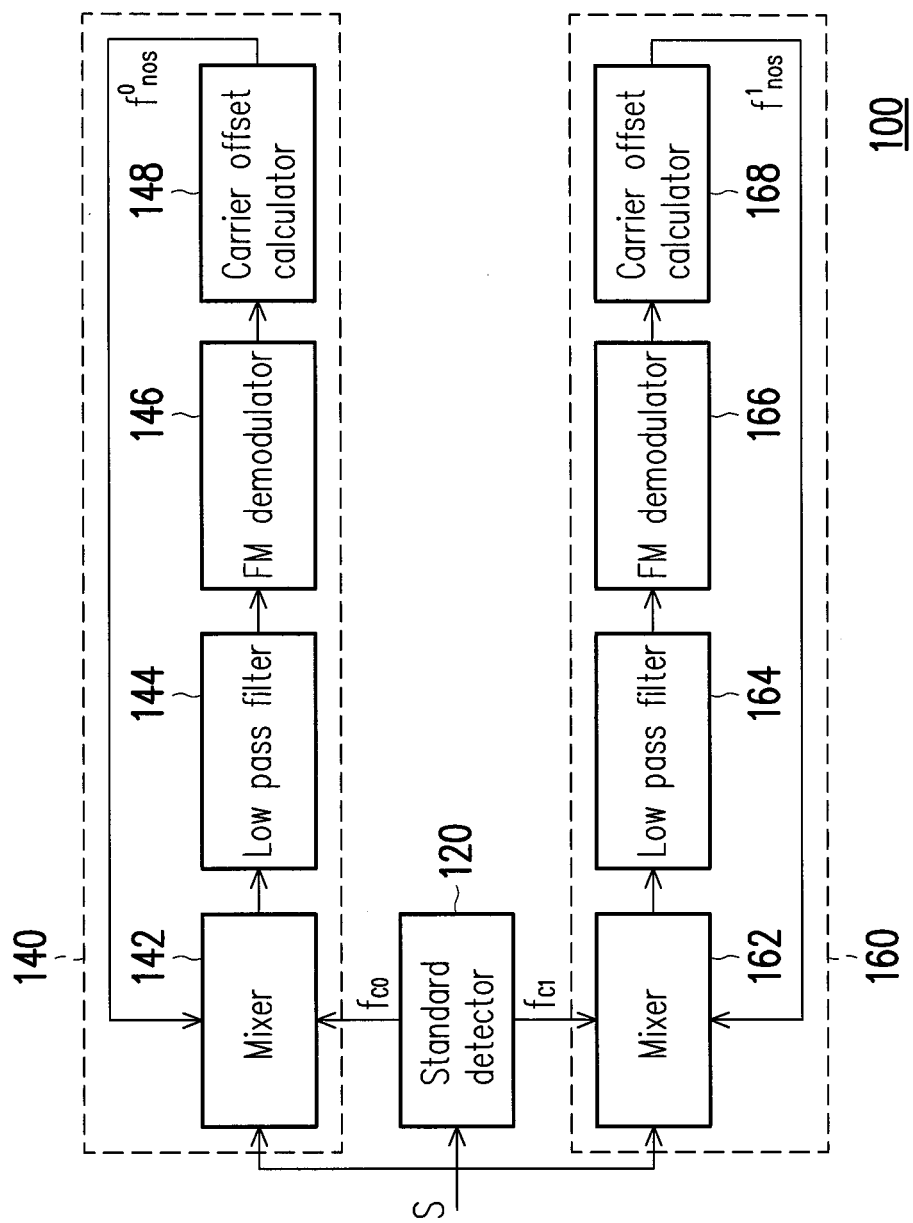
FIG. 2 is a schematic diagram illustrating a carrier frequency offset calibration system commonly seen in the conventional art.
Figure 3:
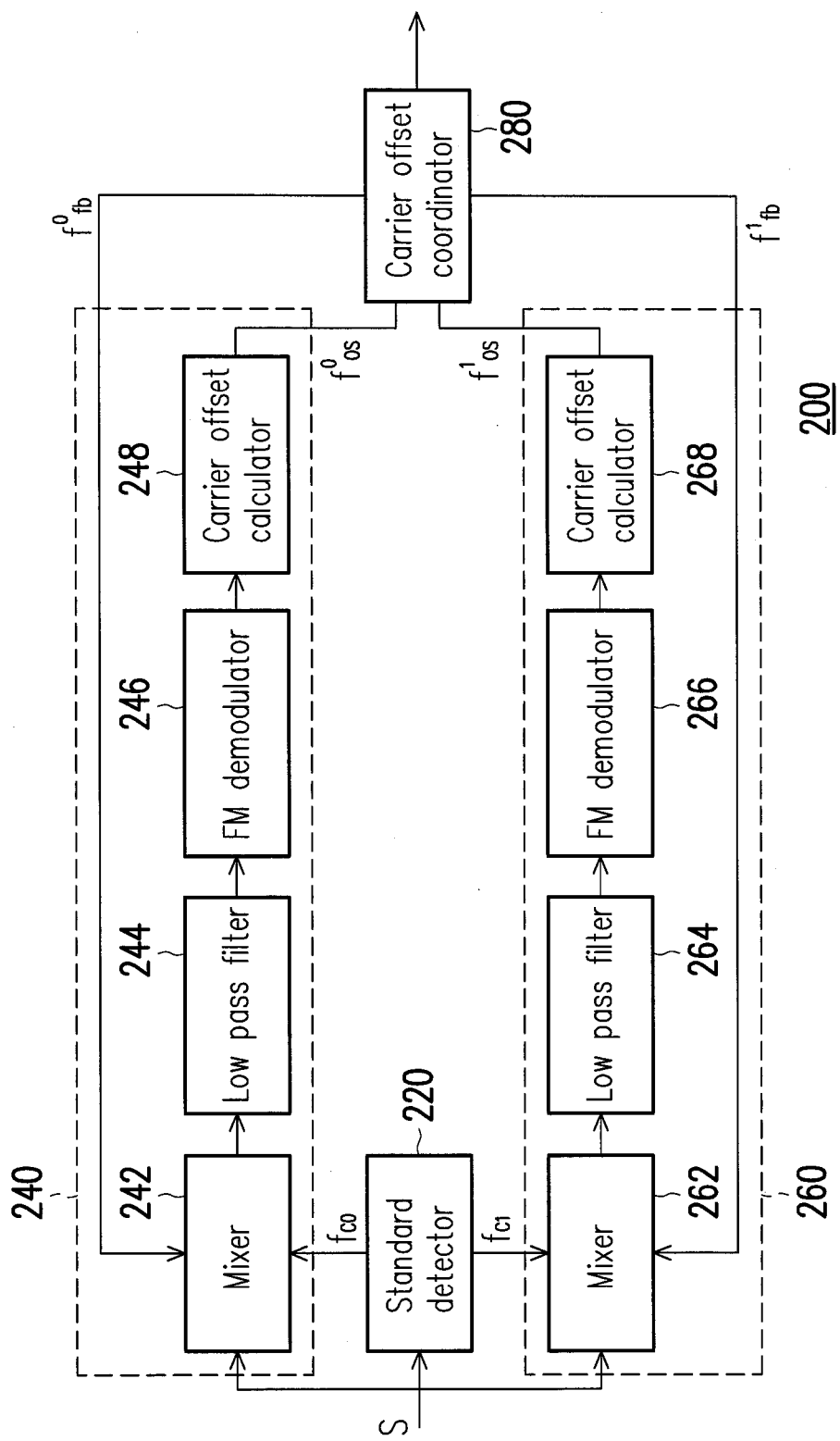
FIG. 3 is a schematic diagram of a carrier frequency offset calibration system according to an embodiment of the invention.
Figure 4:
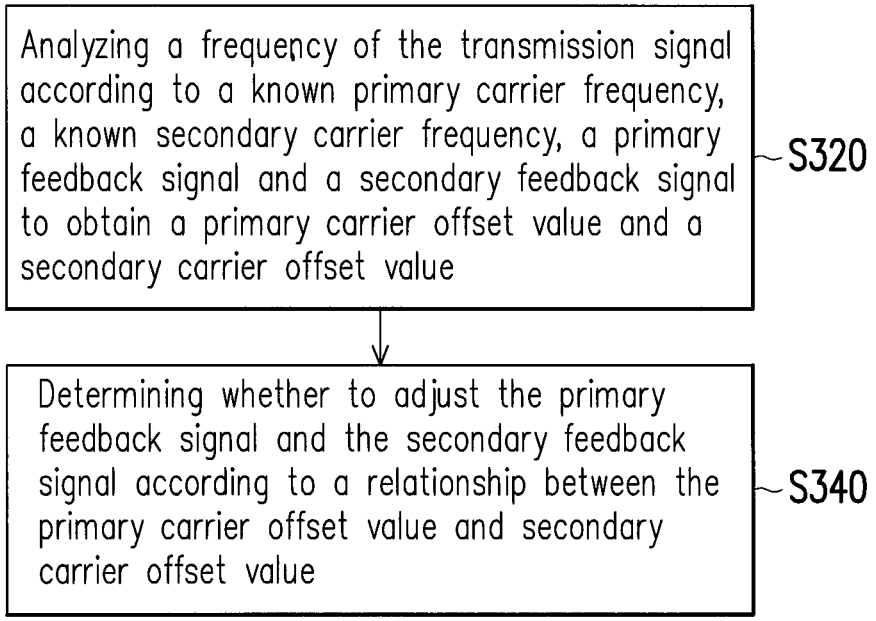
FIG. 4 is a flowchart of a carrier frequency offset calibration method according to an embodiment of the invention.

FIG. 3 is a schematic diagram of a carrier frequency offset calibration system 200 according to an embodiment of the invention. The carrier frequency offset calibration system 200 includes a standard detector 220, a primary demodulation apparatus 240, a secondary demodulation apparatus 260 and a carrier offset coordinator 280. FIG. 4 is a flowchart of a carrier frequency offset calibration method according to an embodiment of the invention. With reference to FIG. 3 and FIG. 4, the carrier frequency offset calibration method includes the following steps. In step S320, the primary demodulation apparatus 240 and the secondary demodulation apparatus 260 respectively analyze a frequency of a transmission signal S according to a known primary carrier frequency (i.e., a center frequency $f_{c0}$) and a known secondary carrier frequency (i.e., a center frequency $f_{c1}$), which are provided by the standard detector 220, a primary feedback signal $f^0{}_{fb}$ and a secondary feedback signal $f^1{}_{fb}$ using mixers 242 and 262, low-pass filters 244 and 264 and carrier offset calculators 248 and 268 to obtain a primary carrier offset value $f^0{}_{os}$ and a secondary carrier offset value $f^1{}_{os}$. The primary demodulation apparatus 240 and the secondary demodulation apparatus 260 are coupled to the standard detector 220 to respectively receive the known primary carrier frequency and the known secondary carrier frequency (e.g., the center frequencies $f_{c0}$ and $f_{c1}$). In the meantime, devices installed in the primary demodulation apparatus 240 and the secondary demodulation apparatus 260 may be the same as those in the demodulation apparatus 140 and the demodulation apparatus 160 illustrated in FIG. 2, and will not repeatedly described hereinafter. The carrier offset coordinator 280 is coupled to the primary demodulation apparatus 240 and the secondary demodulation apparatus 260 and receive the primary carrier offset value $f^0{}_{os}$ and the secondary carrier offset value $f^1{}_{os}$. In step S340, the carrier offset coordinator 280 determines whether to adjust the primary feedback signal $f^0{}_{fb}$ and the secondary feedback signal $f^1{}_{fb}$ according to a relationship between the primary carrier offset value $f^0{}_{os}$ and the secondary carrier offset value $f^1{}_{os}$.

To be more detailed, in an embodiment of the invention, the carrier offset coordinator 280 may correctly determine whether to calibrate the carrier frequencies of the transmission signal S by comparing the primary carrier offset value $f^0{}_{os}$, the secondary carrier offset value $f^1{}_{os}$ and the frequency offset threshold $f_{th}$ so as to determine whether to adjust the primary feedback signal $f^0{}_{fb}$ and the secondary feedback signal $f^1{}_{fb}$. The adjusted primary feedback signal $f^0{}_{fb}$ and secondary feedback signal $f^1{}_{fb}$ are again used to perform the carrier frequency calibration on the transmission signal S. Additionally, for the signal whose carrier frequencies are calibrated, the carrier offset coordinator 280 is further configured to determine whether the carrier frequencies are correctly calibrated.

Figure 5:
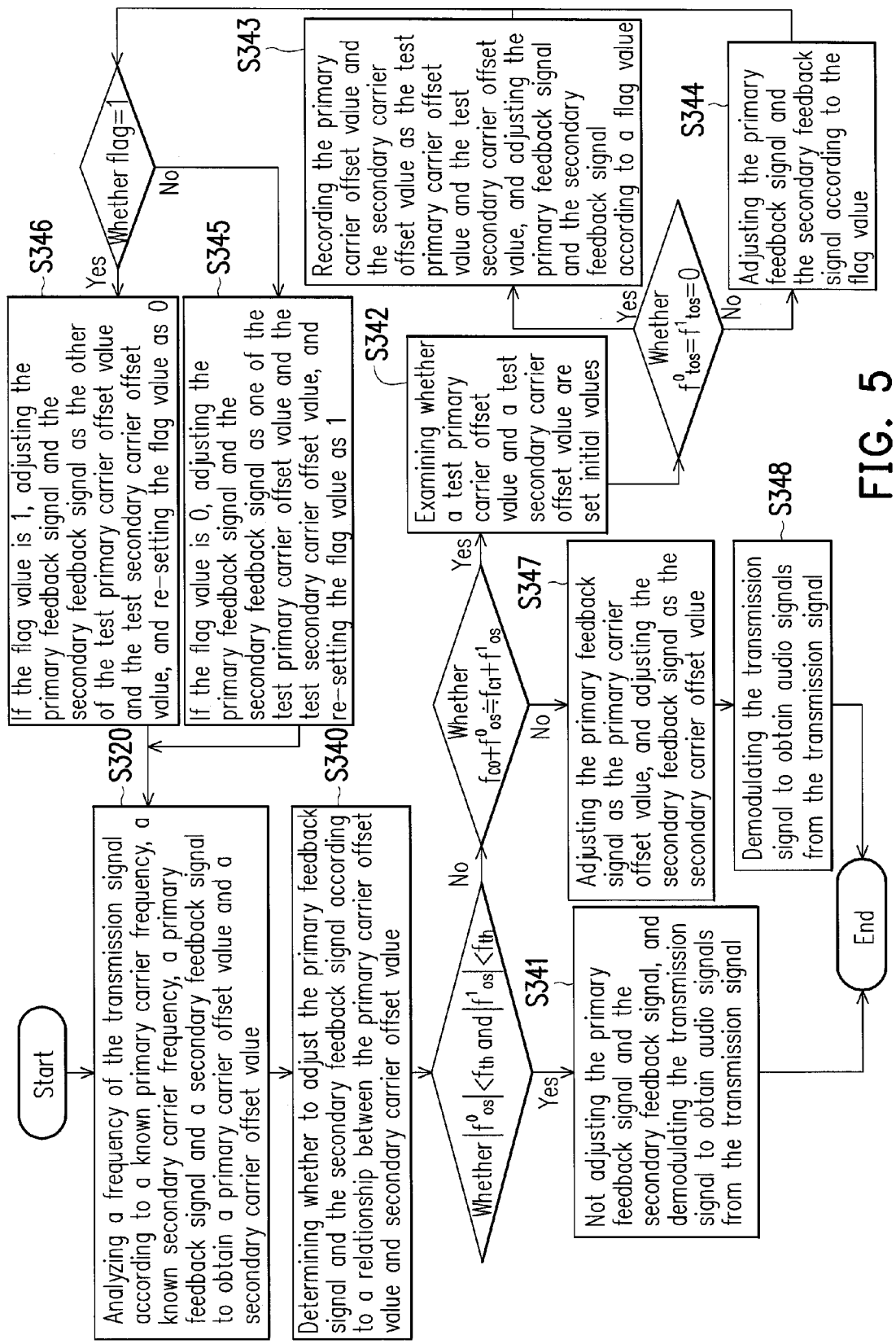
FIG. 5 is a detailed flowchart of a carrier frequency offset calibration method according to another embodiment of the invention.

FIG. 5 is a detailed flowchart of a carrier frequency offset calibration method according to another embodiment of the invention. The embodiment illustrated in FIG. 5 may be likewise inferred with reference to the description related to FIG. 4. With reference to FIG. 5, in step S340, when the carrier offset coordinator 280 determines whether to adjust the primary feedback signal $f^0{}_{fb}$ and the secondary feedback signal $f^1{}_{fb}$, the primary carrier offset value $f^0{}_{fb}$, the secondary carrier offset value $f^1{}_{fb}$ and the frequency offset threshold $f_{th}$ are served as determination bases. If both an absolute value of the primary carrier offset value $f^0{}_{os}$ and an absolute value of the secondary carrier offset value $f^1{}_{os}$ are less than a frequency offset threshold $f_{th}$ (i.e., $|f^0{}_{os}|<f_{th}$ and $|f^1{}_{os}|<f_{th}$), in step S341, the carrier offset coordinator 280 does not adjust the primary feedback signal $f^0{}_{fb}$ and the secondary feedback signal $f^1{}_{fb}$, and the primary demodulation apparatus 240 and the secondary demodulation apparatus 260 demodulate the transmission signal S to obtain a plurality of audio signals (or data signals) from the transmission signal S. The frequency offset threshold $f_{th}$ may be set to be from 100 kHz to 120 kHz.

Figure 1A:
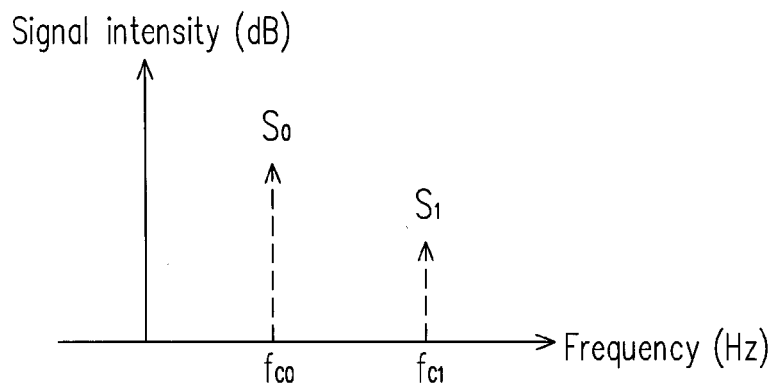
FIGS. 1A to 1G are schematic diagrams showing carrier frequency offsets.
Figure 1B:
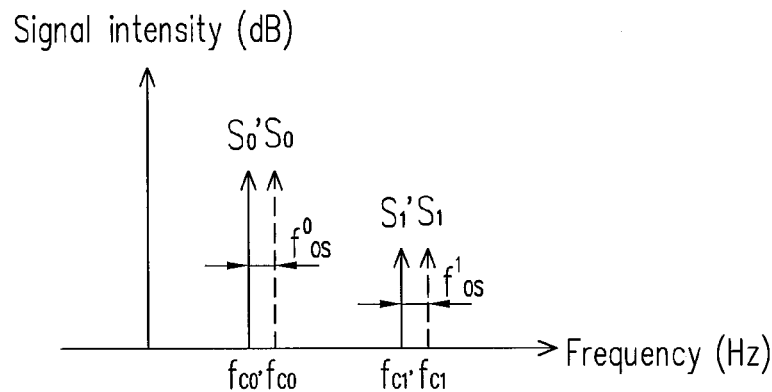

In detail, by setting the frequency offset threshold $f_{th}$, both the absolute value of the primary carrier offset value $f^0{}_{os}$ and the absolute value of the secondary carrier offset value $f^1{}_{os}$ being less than the frequency offset threshold $f_{th}$ means that the carrier frequency offset of the transmission signal S is not serious or is corrected, and the primary demodulation apparatus 240 and the secondary demodulation apparatus 260 may correctly demodulate a plurality of audio signals. In other words, taking the carrier frequency offset situation illustrated in FIG. 1B as an example, i.e., the primary carrier offset value $f^0{}_{os}$ and the secondary carrier offset value $f^1{}_{os}$ does not cause any serious affect to the signal demodulation, and the primary channel signal $S_{0'}$ and the secondary channel signal $S_{1'}$ of the transmission signal S are correctly identified. In the meantime, the transmission signal S are demodulated using the low-pass filters 244 and 264 and frequency modulation (FM) signal demodulators 246 and 266 of the primary demodulation apparatus 240 and the secondary demodulation apparatus 260 to obtain the audio signals therefrom.

Figure 1C:
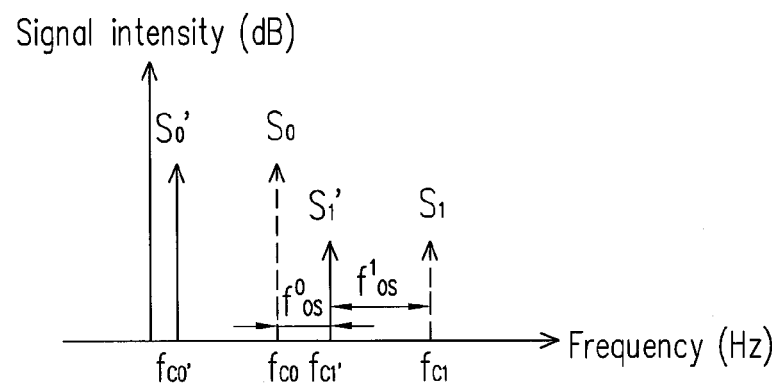
Figure 1D:
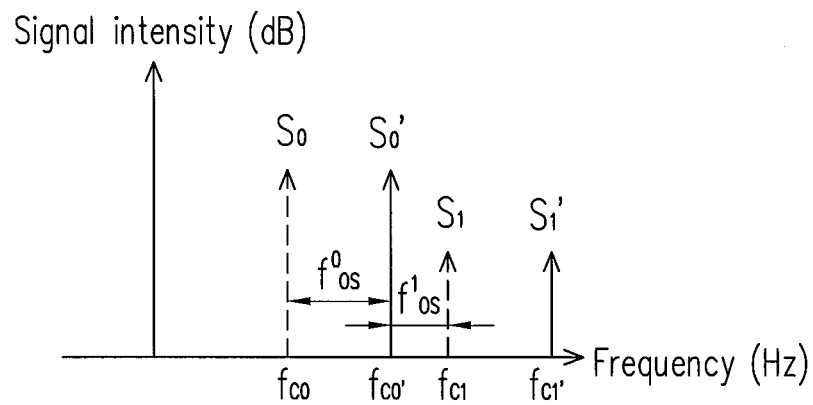

If one of the absolute value of the primary carrier offset value $f^0{}_{os}$ and the absolute value of the secondary carrier offset value $f^1{}_{os}$ is not less than the frequency offset threshold $f_{th}$, the relationship between the primary carrier offset value ft, and the secondary carrier offset value $f^1{}_{os}$ are further examined to determines whether the carrier frequency offset situations illustrated in FIG. 1C and FIG. 1D happen and affect the demodulation of the transmission signal S.

Taking the carrier frequency offset illustrated in FIG. 1C as an example, in a scenario where a frequency of a secondary carrier (the secondary channel signal $S_1$) is greater than a frequency of a primary carrier (the primary channel signal $S_0$), for the carrier primary channel signal $S_{0'}$ and the secondary channel signal $S_{1'}$ received by the frequency offset calibration system 200, a sum $(f_{c0}+f^0{}_{os})$ of the primary carrier offset value $f^0{}_{os}$ and the known primary carrier frequency $f^1{}_{os}$ is substantially equal to a sum $(f_{c1}+f^1{}_{os})$ of the secondary carrier offset value $f^1{}_{os}$ and the known secondary carrier frequency $f_{c1}$. For instance, in FIG. 1C, the secondary channel signal $S_{1'}$ received by the receiving terminal has position falling between the primary channel signal $S_0$ and the secondary channel signal $S_1$ on the spectrum. Due to the carrier frequency offset, a carrier frequency of the secondary channel signal $S_{1'}$ is more adjacent to the primary channel signal $S_0$ than the primary channel signal $S_{0'}$, and as a result, during the demodulation process, the demodulation apparatus would mistakenly recognize the secondary channel signal $S_{1'}$ as the primary channel signal $S_0$ through error. At this time, the relationship between the primary carrier offset value $f^0{}_{os}(f_{c1'}-f_{c0})$ and the secondary carrier offset value $f^1{}_{os}(f_{c1'}-f_{c1})$ obtained by the primary demodulation apparatus 240 and the secondary demodulation apparatus 260 would satisfy the condition that the sum $(f_{c0}+f^0{}_{os})$ of the primary carrier offset value and the known primary carrier frequency is substantially equal to the sum $(f_{c1}+f^1{}_{os})$ of the secondary carrier offset value and the known secondary carrier frequency, which may be expressed by $f_{c0}+f^0{}_{os}\approx f_{c1}+f^1{}_{os}$.

When the sum of the primary carrier offset value and the known primary carrier frequency is substantially equal to the sum of the secondary carrier offset value and the known secondary carrier frequency, in step S342 of the carrier frequency offset calibration method, the carrier offset coordinator 280 further examines whether a test primary carrier offset value $f^0_{tos}$ and a test secondary carrier offset value $f^1_{tos}$ are set initial values. In the present embodiment, the set initial values of the test primary carrier offset value $f^0_{tos}$ and the test secondary carrier offset value $f^1_{tos}$ may be 0 respectively, but the invention is not limited thereto. If the test primary carrier offset value $f^0_{tos}$ and the test secondary carrier offset value $f^1_{tos}$ are the set initial values, in step S343, the carrier offset coordinator 280 respectively records the primary carrier offset value $f^0_{os}$ and the secondary carrier offset value $f^1_{os}$ as the test primary carrier offset value $f^0_{tos}$ and the test secondary carrier offset value $f^1_{tos}$ and adjusts the primary feedback signal $f^0_{fb}$ and the secondary feedback signal $f^1_{fb}$ as one of the test primary carrier offset value $f^0_{tos}$ and the test secondary carrier offset value $f^1_{tos}$ according to a flag value flag. Otherwise, if the test primary carrier offset value $f^0_{tos}$ and the test secondary carrier offset value $f^1_{tos}$ are not the set initial values, in step S344, the carrier offset coordinator 280 adjusts the primary feedback signal $f^0_{fb}$ and the secondary feedback signal $f^1_{fb}$ as one of the test primary carrier offset value $f^0_{tos}$ and the test secondary carrier offset value $f^1_{tos}$ according to the flag value flag. In the present embodiment, the flag value flag is set to be 0 and 1. If determining that the flag value flag is 0 (i.e., flag=0), in step S345, the carrier offset coordinator 280 adjusts the primary feedback signal $f^0_{fb}$ and the secondary feedback signal $f^1_{fb}$ as one of the test primary carrier offset value $f^0_{tos}$ and the test secondary carrier offset value $f^1_{tos}$ and sets the flag value flag to be 1. In step S345 (illustrated in FIG. 5) of the present embodiment, the primary feedback signal $f^0_{fb}$ and the secondary feedback signal $f^1_{fb}$ are adjusted as the test secondary carrier offset value $f^1_{tos}$. Otherwise, if determining that flag value flag is 1 (i.e., flag=1), in step S346, the carrier offset coordinator 280 adjusts the primary feedback signal $f^0_{fb}$ and the secondary feedback signal $f^1_{fb}$ as the other of the test primary carrier offset value $f^0_{tos}$ and the test secondary carrier offset value $f^1_{tos}$ and sets the flag value to be 0. Similarly to the aforementioned embodiment, in step S346 of the present embodiment, the primary feedback signal $f^0_{fb}$ and the secondary feedback signal $f^1_{fb}$ are adjusted as the test primary carrier offset value $f^0_{tos}$. In detail, the primary feedback signal $f^0_{fb}$ and the secondary feedback signal $f^1_{fb}$ may be respectively returned to the mixers 242 and 262 of the primary demodulation apparatus 240 and the secondary demodulation apparatus 260 by the carrier offset coordinator 280 to achieve the carrier frequency offset calibration on the transmission signal S. In other words, no matter whether step S345 or step S346 is performed, the carrier frequency offset calibration method returns to step S320, and the primary demodulation apparatus 240 and the secondary demodulation apparatus 260 again analyze the frequency of the transmission signal S according to the known primary carrier frequency (i.e., the center frequency $f_{c0}$), the known secondary carrier frequency (i.e., the center frequency $f_{c1}$), primary feedback signal $f^0_{fb}$ and the secondary feedback signal $f^1_{fb}$ to obtain a new primary carrier offset value $f^0_{os}$ and a new secondary carrier offset value $f^1_{os}$. Meanwhile, in step S340, the carrier offset coordinator 280 again compares the primary carrier offset value $f^0_{os}$ and the secondary carrier offset value $f^1_{os}$ with the frequency offset threshold $f_{th}$ to determine whether the current primary feedback signal $f^0_{fb}$ and secondary feedback signal $f^1_{fb}$ may contribute to correct demodulation for the primary demodulation apparatus 240 and the secondary demodulation apparatus 260. Additionally, after the demodulation is correctly performed, the carrier offset coordinator 280 further re-set the test primary carrier offset value $f^0_{tos}$ and the test secondary carrier offset value $f^1_{tos}$ as the set initial values to perform the carrier frequency calibration operation again.

The carrier frequency offset calibration method and the carrier frequency offset calibration system 200 provided by the invention can be adapted to various carrier frequency offset situations to achieve correct carrier frequency offset calibration effects. Taking FIG. 1D as an example, the carrier frequency (i.e., the center frequency $f_{c0'}$) of the received primary channel signal $S_{0'}$ falls between the carrier frequency of the primary channel signal $S_0$ (i.e., the center frequency $f_{c0}$) and the carrier frequency of the secondary channel signal $S_1$ (i.e., the center frequency $f_{c1}$). The secondary channel signal $S_{1'}$ received by the carrier frequency offset calibration system 200 has the maximum carrier frequency (i.e., the center frequency $f_{c1'}$) which is more away from the secondary channel signal $S_1$ than the carrier frequency of the received primary channel signal $S_{0'}$ (i.e., the center frequency $f_{c0'}$) on the spectrum. During the carrier frequency calibration operation, the carrier frequency offset situation illustrated in FIG. 1D still satisfies the relationship that the sum $(f_{c0}+f^0_{os})$ of the primary carrier offset value $f^0_{os}$ and the known primary carrier frequency $f_{c0}$ is substantially equal to the sum $(f_{c0}+f^0_{os})$ of the secondary carrier offset value $f^1_{os}$ and the known secondary carrier frequency $f_{c1}$, which is expressed by $f_{c0}+f^0_{os} \approx f_{c1}+f^1_{os}$, and thus, and thus, the primary channel signal $S_{0'}$ and the secondary channel signal $S_{1'}$ may still be correctly identified for being calibrated.

Figure 1E:
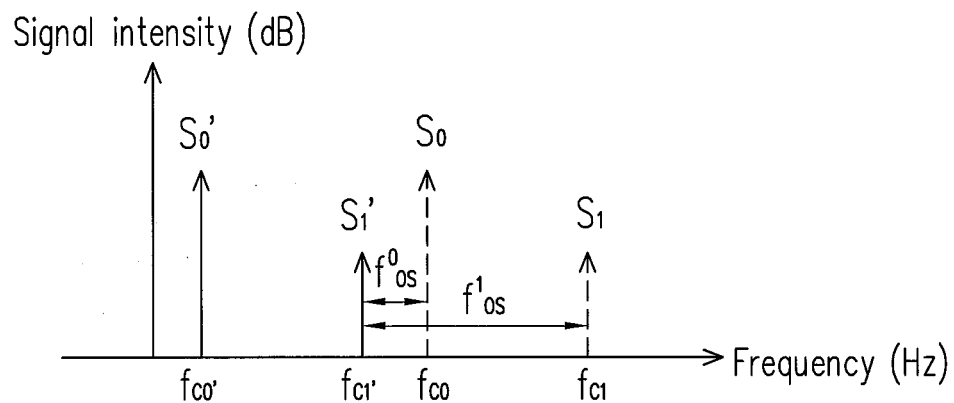
Figure 1F:
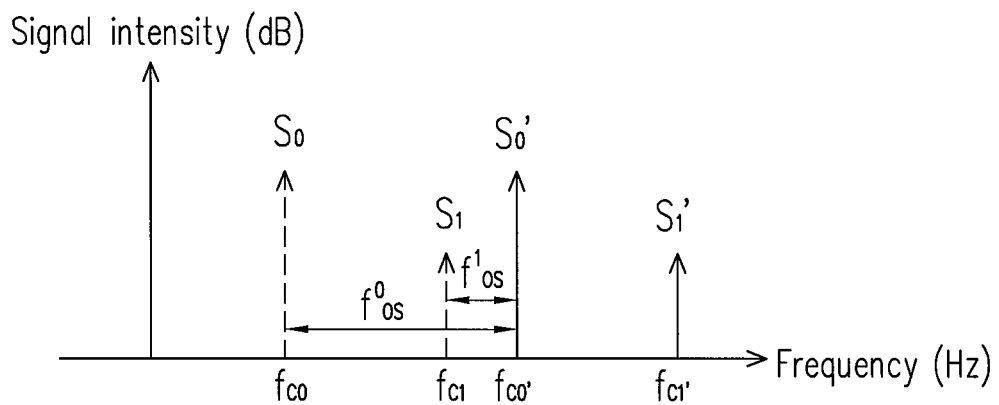

FIGS. 1E to 1F are schematic diagrams showing carrier frequency offsets. Referring to FIG. 1E, on the spectrum, the carrier frequency (i.e., the center frequency $f_{c1}$) of the secondary channel signal $S_1$ is greater than the carrier frequency (i.e., the center frequency $f_{c0}$) of the primary channel signal $S_0$, the carrier frequency of the primary channel signal $S_0$ is greater than the carrier frequency (i.e., the center frequency $f_{c1'}$) of the received secondary channel signal $S_{1'}$, the carrier frequency of the secondary channel signal $S_{1'}$ is greater than the carrier frequency (i.e., the center frequency $f_{c1'}$) of the secondary channel signal $S_{1'}$, and the carrier frequency of the secondary channel signal $S_{1'}$ is greater than the carrier frequency (i.e., the center frequency $f_{c0'}$) of the received primary channel signal $S_{0'}$, that is, $f_{c0'}<f_{c1'}<f_{c0}<f_{c1}$. Referring to FIG. 1F, on the spectrum, the carrier frequency (i.e., the center frequency $f_{c1'}$) of the received secondary channel signal $S_{1'}$ is greater than the carrier frequency (i.e., the center frequency $f_{c0'}$) of the received primary channel signal $S_{0'}$, the carrier frequency (i.e., the center frequency $f_{c0'}$) of the received primary channel signal $S_{0'}$ is greater than the carrier frequency (i.e., the center frequency $f_{c1}$) of the secondary channel signal $S_1$ and the carrier frequency (i.e., the center frequency $f_{c1}$) of the secondary channel signal $S_1$ is greater than the carrier frequency (i.e., the center frequency $f_{c0}$) of the primary channel signal $S_0$, that is $f_{c1}<f_{c0}<f_{c1'}<f_{c0'}$. However, no matter which frequency offset situation occurs, based on the carrier frequency offsets still satisfying the relationship that the sum $(f_{c0}+f^0_{os})$ of the primary carrier offset value $f^0_{os}$ and the known primary carrier frequency $f_{c0}$ is substantially equal to the sum $(f_{c1}+f^1_{os})$ of the secondary carrier offset value $f^1_{os}$ and the known secondary carrier frequency $f_{c1}$ (which is expressed by $f_{c0}+f^0_{os} \approx f_{c1}+f^1_{os}$), the carrier frequency offset calibration method and the carrier frequency offset calibration system 200 may correctly perform the carrier frequency offset calibration operation.

It should be noted that the carrier frequency offset is illustrated as a scenario where the frequency of the secondary carrier (i.e., secondary channel signal $S_1$) is greater than the frequency of the primary carrier (i.e., primary channel signal $S_0$) in FIG. 1C as an example. However, in a scenario where the frequency of the primary carrier (i.e., primary channel signal $S_0$) is greater than the frequency of the secondary carrier (i.e., secondary channel signal $S_1$), when a carrier frequency offset appears in the carrier frequencies of the primary channel signal $S_0$, of the receiving terminal and the secondary channel signal $S_1$, the relationship that the sum $(f_{c0}+f^0{}_{os})$ of the primary carrier offset value $f^0{}_{os}$ and the known primary carrier frequency $f_{c0}$ is substantially equal to the sum $s(f_{c1}+f^1{}_{os})$ of the secondary carrier offset value $f^1{}_{os}$ and the known secondary carrier frequency $f_{c1}$, i.e., $f_{c0}+f^0{}_{os}\approx f_{c1}+f^1{}_{os}$, is still satisfied. For instance, on the spectrum, the carrier frequency (i.e., the center frequency $f_{c0}$) of the primary channel signal $S_0$ is greater than the carrier frequency (i.e., the center frequency $f_{c1}$) of the secondary channel signal $S_1$, the carrier frequency (i.e., the center frequency $f_{c1}$) of the secondary channel signal $S_1$ is greater than the carrier frequency (i.e., the center frequency $f_{c0'}$) of the received primary channel signal $S_{0'}$, and the carrier frequency (i.e., the center frequency $f_{c0'}$) of the primary channel signal $S_{0'}$ is greater than the carrier frequency (i.e., the center frequency $f_{c1'}$) of the received secondary channel signal $S_{1'}$, that is $f_{c1'}<f_{c0'}<f_{c1}<f_{c0}$, or alternatively, for instance, on the spectrum, the carrier frequency (i.e., the center frequency $f_{c0'}$) of the received primary channel signal $S_{0'}$, is greater than the carrier frequency (i.e., the center frequency $f_{c1'}$) of the received secondary channel signal $S_{1'}$, the carrier frequency (i.e., the center frequency $f_{c1'}$) of the received secondary channel signal $S_{1'}$ is greater than the carrier frequency (i.e., the center frequency $f_{c0}$) of the primary channel signal $S_0$, and the carrier frequency (i.e., the center frequency $f_{c0}$) of the primary channel signal $S_0$ is greater than the carrier frequency (i.e., the center frequency $f_{c1}$) of the secondary channel signal $S_1$, that is, $f_{c1}<f_{c0}<f_{c1'}<f_{c0'}$. In other words, even though in the premise that the frequency of the primary carrier (i.e., the primary channel signal $S_0$) is greater than the secondary carrier (i.e., the secondary channel signal $S_1$), the standard for determining how to perform the carrier frequency calibration operation of the transmission signal S does not need to be changed correspondingly.

In steps S320 through S346 of the carrier frequency offset calibration method, the carrier frequency offset calibration operation is performed on the transmission signal S by adjusting the primary feedback signal $f^0{}_{fb}$ and the secondary feedback signal $f^1{}_{fb}$, and whether the frequency offset of the transmission signal S is correctly compensated is again confirmed, such that the transmission signal S is correctly demodulated to obtain a plurality of audio signals therefrom.

Referring to FIG. 1C again, after confirming that the sum $(f_{c0}+f^0{}_{os})$ of the primary carrier offset value $f^0{}_{os}$ and the known primary carrier frequency $f_{c0}$ is substantially equal to the sum $(f_{c1}+f^1{}_{os})$ of the secondary carrier offset value $f^1{}_{os}$ and the known secondary carrier frequency $f_{c1}$, first in step S342, the carrier offset coordinator 280 examines whether the test primary carrier offset value $f^0{}_{tos}$ and the test secondary carrier offset value $f^1{}_{tos}$ are the set initial values. If both the test primary carrier offset value $f^0{}_{tos}$ and the test secondary carrier offset value $f^1{}_{tos}$ are the set initial values (e.g., both are 0, i.e., $f^0{}_{tos}=f^1{}_{tos}=0$), then in step S343, the carrier offset coordinator 280 records the primary carrier offset value $f^0{}_{os}$ and the secondary carrier offset value $f^1{}_{os}$ as the test primary carrier offset value $f^0{}_{tos}$ and the test secondary carrier offset value $f^1{}_{tos}$ and in step S345 or S346 further adjusts the primary feedback signal $f^0{}_{fb}$ and the secondary feedback signal $f^1{}_{fb}$ (for the first times). The primary feedback signal $f^0{}_{fb}$ and the secondary feedback signal $f^1{}_{fb}$ are one of the test primary carrier offset value (the primary carrier offset value $f^0{}_{os}$ illustrated in FIG. 1C) and the test secondary carrier offset value (the secondary carrier offset value $f^1{}_{os}$ illustrated in FIG. 1C). If the carrier offset coordinator 280 selects to use the test secondary carrier offset value as the primary feedback signal $f^0{}_{fb}$ and the secondary feedback signal $f^1{}_{fb}$, the carrier frequencies (i.e., the center frequencies $f_{c0'}$ and $f_{c1'}$) of the transmission signal S are adjusted to be approximate to the carrier frequencies (i.e., the center frequencies $f_{c0}$ and $f_{c1}$) of the primary channel signal $S_0$ and the secondary channel signal $S_1$ after being correspondingly increased by the mixers 242 and 262. At this time, both the absolute values of the primary carrier offset value $f^0{}_{os}$ and the secondary carrier offset value $f^1{}_{os}$ respectively obtained again by the primary demodulation apparatus 240 and the secondary demodulation apparatus 280 are less than the frequency offset threshold $f_{th}$. Thereafter, the carrier frequency offset calibration method stops adjusting the primary feedback signal $f^0{}_{fb}$ and the secondary feedback signal $f^1{}_{fb}$, and enters step S341, where the primary demodulation apparatus 240 and the secondary demodulation apparatus 242 demodulate the transmission signal S to obtain the audio signals therefrom using the known primary carrier frequency (i.e., the center frequency $f_{c0}$), the known secondary carrier frequency (i.e., the center frequency $f_{c1}$), the primary feedback signal $f^0{}_{fb}$ and the secondary feedback signal $f^1{}_{fb}$.

Figure 1G:
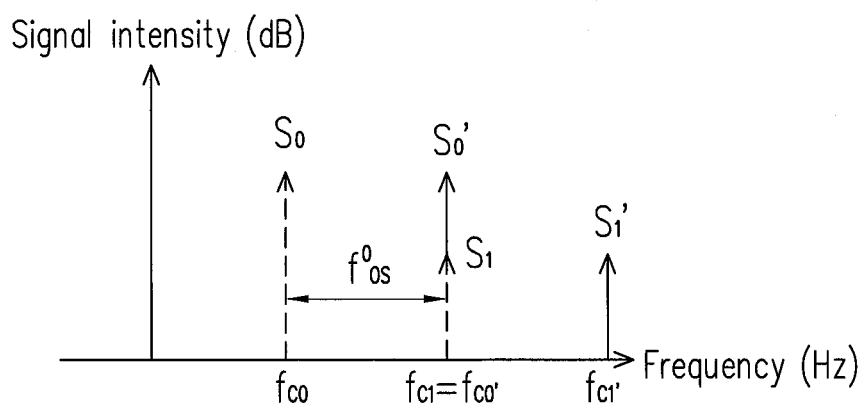

Nevertheless, in the carrier frequency offset situation illustrated in FIG. 1D, if the carrier offset coordinator 280 selects to use the test secondary carrier offset value (i.e., the secondary carrier offset value $f^1{}_{os}$ illustrated in FIG. 1D) as the primary feedback signal $f^0{}_{fb}$ and the secondary feedback signal $f^1{}_{fb}$, the offset between the carrier frequencies (i.e., the center frequencies $f_{c0'}$ and $f_{c1'}$) of the transmission signal S is otherwise even worse after being correspondingly decreased by the mixers 242 and 262. With reference to FIG. 1G, FIG. 1G schematically illustrated another carrier frequency offset situation. Due to the test secondary carrier offset value (i.e., the secondary carrier offset value $f^1{}_{os}$ illustrated in FIG. 1D) selected as the primary feedback signal $f^0{}_{fb}$ and the secondary feedback signal $f^1{}_{fb}$, the center frequencies $f_{c0'}$ and $f_{c1'}$ of the transmission signal S are mistakenly decreased. In this case, again, one of the absolute values of the primary carrier offset value $f^0{}_{os}$ and the secondary carrier offset value $f^1{}_{os}$ obtained in step S320 may be probably greater than the frequency offset threshold $f_{th}$, and the sum $(f_{c0}+f^0{}_{os})$ of the primary carrier offset value $f^0{}_{os}$ and the known primary carrier frequency $f_{c0}$ is substantially equal to the sum $(f_{c1}+f^1{}_{os})$ of the secondary carrier offset value $f^1{}_{os}$ and the known secondary carrier frequency $f_{c1}$. In such scenario, the test primary carrier offset value $f^0{}_{tos}$ and the test secondary carrier offset value $f^1{}_{tos}$ are no longer the set initial values, and thus, in step S344, the carrier offset coordinator 280 adjusts the primary feedback signal $f^0{}_{fb}$ and the secondary feedback signal $f^1{}_{fb}$ (for the second time) according to the flag value, and the primary feedback signal $f^0{}_{fb}$ and the secondary feedback signal $f^1{}_{fb}$ are the other of the test primary carrier offset value $f^0{}_{tos}$ and the test secondary carrier offset value $f^1{}_{tos}$.

In detail, in the carrier frequency offset situations illustrated in FIGS. 1C and 1D, if one of the primary carrier offset value $f^0{}_{os}$ and the secondary carrier offset value $f^1{}_{os}$ is correctly fed back, the center frequencies $f_{c0'}$ and $f_{c1'}$ of the transmission signal S may be adjust to be approximate to the center frequencies $f_{c0}$ and $f_{c1}$ of the primary channel signal $S_0$ and the secondary channel signal $S_1$. (In FIG. 1C, if the secondary carrier offset value $f^1{}_{os}$ is selected as a feedback signal, the carrier frequency calibration operation may be correctly performed on the transmission signal S, while in FIG. 1D, if the primary carrier offset value $f^0{}_{os}$ is selected as a feedback signal, the carrier frequency calibration operation may be correctly performed on the transmission signal S). Therefore, in the carrier frequency offset calibration method of the present embodiment, the recorded primary carrier offset value $f^0_{os}$ and secondary carrier offset value $f^1_{os}$ (i.e., the test primary carrier offset value $f^0_{tos}$ and the test secondary carrier offset value $f^1_{tos}$) are examined by means of feedback testing so as to correctly select the correct feedback signals.

In step S343, the carrier offset coordinator 280 adjusts the primary feedback signal $f^0_{fb}$ and the secondary feedback signal $f^1_{fb}$ according to the flag value flag. In other words, the carrier offset coordinator 280 determines whether the flag value flag is equal to 1 (i.e., flag=1) or whether the flag value flag is equal to 0 (i.e., flag=0). If the flag value flag is 0, in step S345, the primary feedback signal $f^0_{fb}$ and the secondary feedback signal $f^1_{fb}$ are set to be one of the test primary carrier offset value $f^0_{tos}$ and the test secondary carrier offset value $f^1_{tos}$, e.g., the test secondary carrier offset value $f^1_{tos}$, and the flag value flag is re-set as 1. If the flag value flag is 1, in step S346, the primary feedback signal $f^0_{fb}$ and the secondary feedback signal $f^1_{fb}$ are set to be the other of the test primary carrier offset value $f^0_{tos}$ and the test secondary carrier offset value $f^1_{tos}$, e.g., the test primary carrier offset value $f^0_{tos}$.

Since the steps of the carrier frequency offset calibration method are continuous, the flag value is retained. To be more specific, if the primary feedback signal $f^0_{fb}$ and the secondary feedback signal $f^1_{fb}$ are generated in step S343, the flag value is 1, and after setting the primary feedback signal $f^0_{fb}$ and the secondary feedback signal $f^1_{fb}$, the carrier offset coordinator 280 re-sets the flag value as 0. Meanwhile, from step S345 to step S344, the carrier offset coordinator 280 sets the primary feedback signal $f^0_{fb}$ and the secondary feedback signal $f^1_{fb}$ according to the flag value (the flag value now is 0) in the same way and re-sets the flag value as 1.

In the carrier frequency offset calibration method of the present embodiment, if the carrier offset coordinator 280 determines that the absolute value of the primary carrier offset value $f^0_{os}$ or the absolute value of the secondary carrier offset value $f^1_{os}$ is not less than the frequency offset threshold $f_{th}$, and the sum $(f_{c0}+f^0_{os})$ of the primary carrier offset value $f^0_{os}$ and the known primary carrier frequency $f_{c0}$ is not substantially equal to the sum $(f_{c1}+f^1_{os})$ of the secondary carrier offset value $f^1_{os}$ and the known secondary carrier frequency $f_{c1}$, in step S347, the carrier offset coordinator 280, adjusts the primary feedback signal $f^0_{fb}$ as the primary carrier offset value $f^0_{os}$ and the secondary feedback signal $f^1_{fb}$ as the secondary carrier offset value $f^1_{os}$, and in step S348, the primary demodulation apparatus 240 and the secondary demodulation apparatus 260 demodulate the transmission signal S to obtain the audio signals from the transmission signal S. In this case, the primary demodulation apparatus 240 and the secondary demodulation apparatus 260 respectively perform the carrier frequency calibration and signal demodulation operations on the transmission signal S according to the known primary carrier frequency $f_{c0}$, the known secondary carrier frequency $f_{c1}$, the primary feedback signal $f^0_{fb}$ and the secondary feedback signal $f^1_{fb}$.

Figure 6:
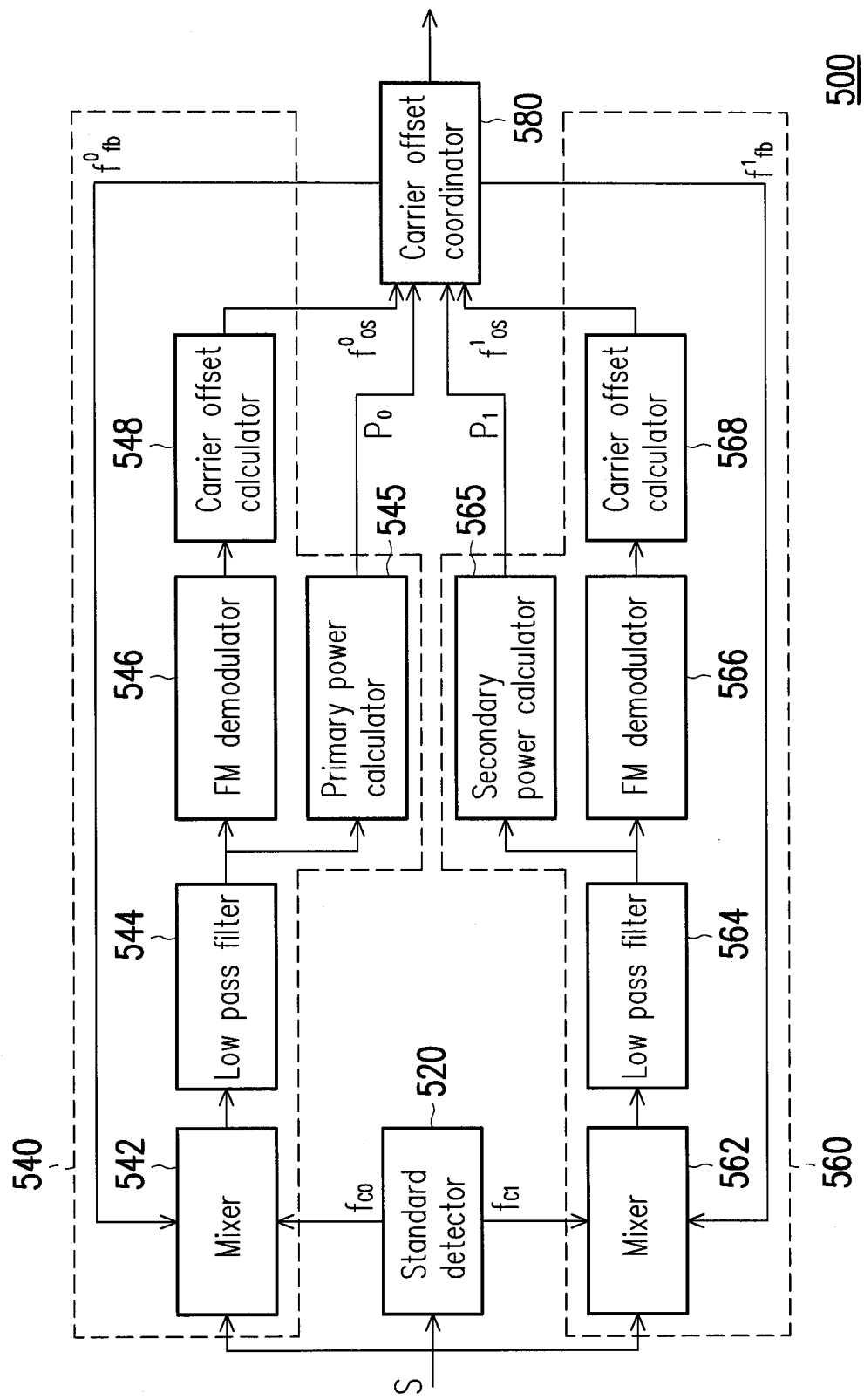
FIG. 6 is a schematic diagram of a carrier frequency offset calibration system according to another embodiment of the invention.
Figure 7A:
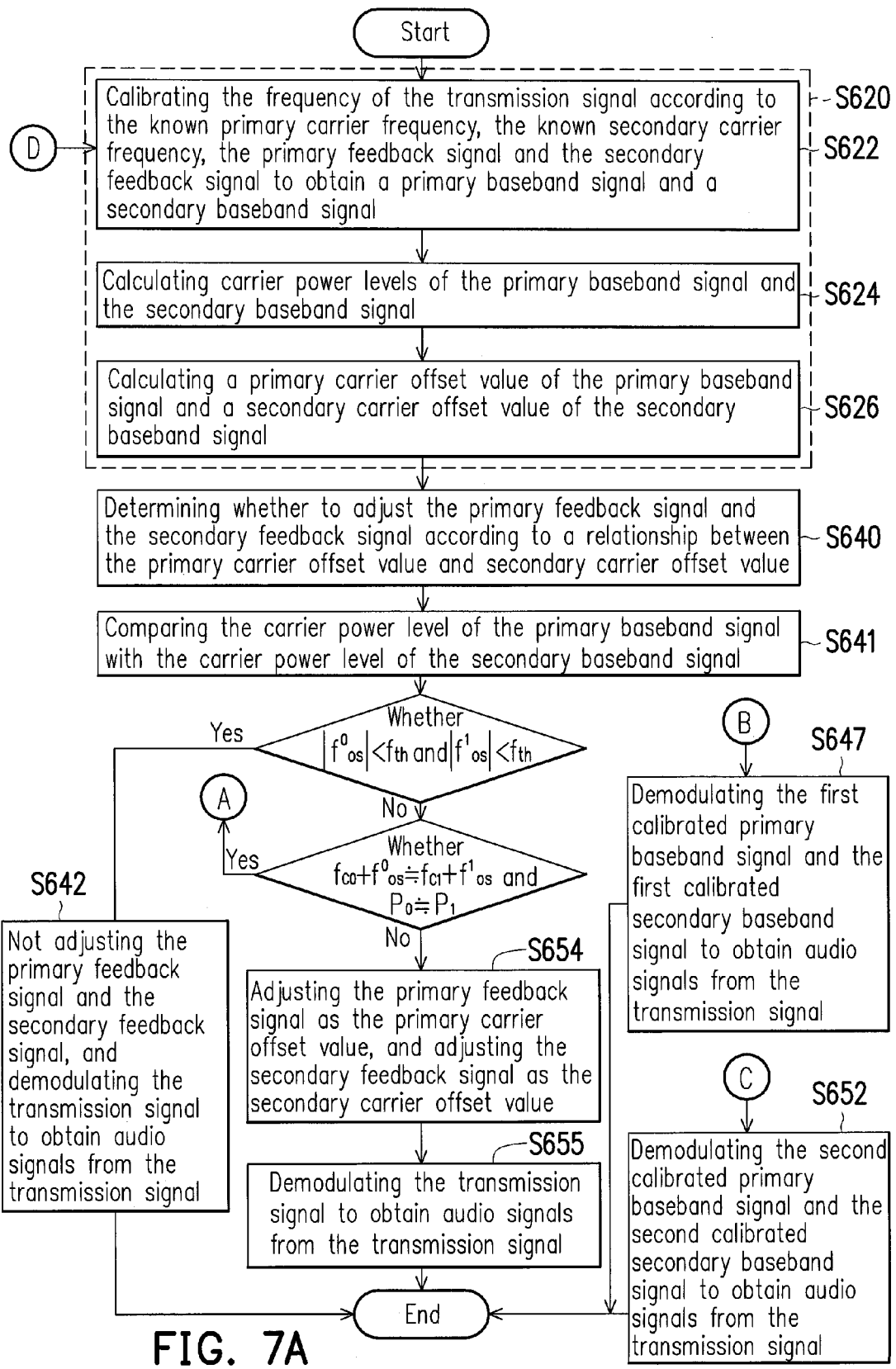
FIGS. 7A to 7B are detailed flowcharts of a carrier frequency offset calibration method according to another embodiment of the invention.
Figure 7B:
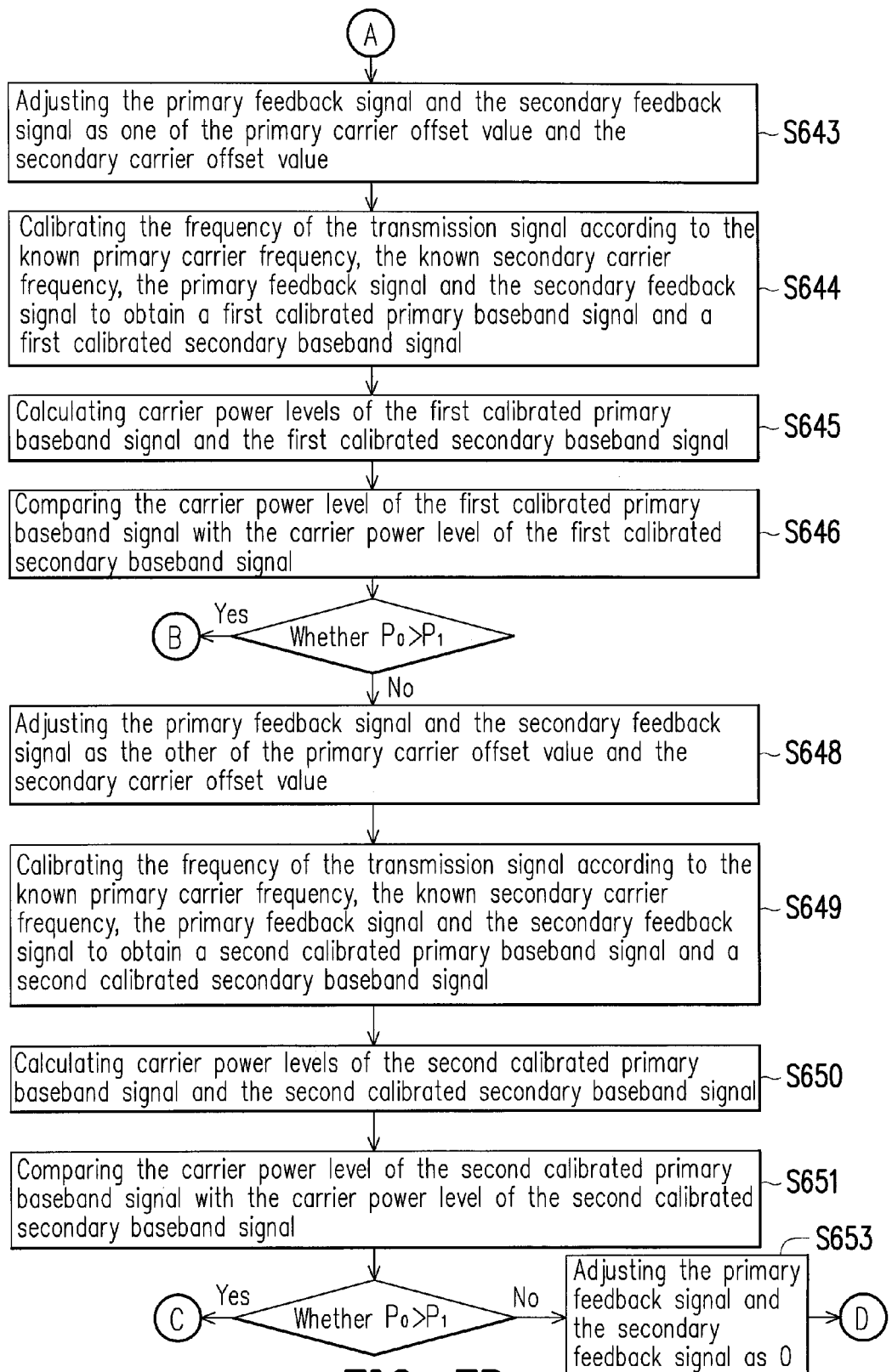

In the previous embodiment, the carrier frequency calibration operation is determined whether to be performed only by comparing the primary carrier offset value and the secondary carrier offset value with the frequency offset threshold. However, in the invention, the way for the carrier frequency offset calibration system to determine whether to perform the carrier frequency calibration operation is not limited thereto. FIG. 6 is a schematic diagram of a carrier frequency offset calibration system 500 according to another embodiment of the invention. FIGS. 7A to 7B are detailed flowcharts of a carrier frequency offset calibration method according to another embodiment of the invention. The embodiment illustrated in FIG. 6 and FIGS. 7A to 7B may be inferred with reference to the descriptions with respect to FIGS. 1 to 4. With reference to FIG. 6 and FIGS. 7A to 7B, the carrier frequency offset calibration system 500 further includes a primary power calculator 545 and a secondary power calculator 565 respectively disposed in the primary demodulation apparatus 540 and the secondary demodulation apparatus 560 and configured to calculate carrier power levels of signals.

In the present embodiment, the carrier frequency offset calibration method further utilizes a signal carrier power level to determine whether to perform the carrier frequency calibration operation. In step S620, a primary demodulation apparatus 540 and a secondary demodulation apparatus 560 respectively analyze the frequency of the transmission signal S according to the known primary carrier frequency (i.e., the center frequency $f_{c0}$), the known secondary carrier frequency (i.e., the center frequency $f_{c1}$), the primary feedback signal $f^0_{fb}$ and the secondary feedback signal $f^1_{fb}$. Step 620 further includes the following steps. In step S622, the primary demodulation apparatus 540 and the secondary demodulation apparatus 560 further respectively perform the frequency calibration on the transmission signal S according to the known primary carrier frequency (i.e., the center frequency $f_{c0}$), the known secondary carrier frequency (i.e., the center frequency $f_{c1}$), the primary feedback signal $f^0_{fb}$ and the secondary feedback signal $f^1_{fb}$ to obtain a primary baseband signal and a secondary baseband signal. In step S624, the primary power calculator 545 and the secondary power calculator 565 are configured to calculate carrier power levels $P_0$ and $P_1$ of the primary baseband signal and the secondary baseband signal. Additionally, in step S626, the primary demodulation apparatus 540 and the secondary demodulation apparatus 560 respectively calculate a primary carrier offset value $f^0_{os}$ and a secondary carrier offset value $f^1_{os}$ of the primary baseband signal and the secondary baseband signal.

Then, in step S640, the carrier offset coordinator 580 determines whether to adjust the primary feedback signal $f^0_{fb}$ and the secondary feedback signal $f^1_{fb}$ according to a relationship between the primary carrier offset value $f^0_{os}$ and the secondary carrier offset value $f^1_{os}$. In step S640, the carrier offset coordinator 580 further compares the carrier power level $P_0$ of the primary baseband signal with the carrier power level $P_1$ of the secondary baseband signal in step S641. In a scenario where a frequency of the secondary carrier (i.e., the secondary channel signal $S_1$) is greater than a frequency of the primary carrier (i.e., the primary channel signal $S_0$), if the carrier offset coordinator 580 determines whether an absolute value of the primary carrier offset value $f^0_{os}$ or an absolute value of the secondary carrier offset value $f^1_{os}$ is not less than the frequency offset threshold $f_{th}$, a sum $(f_{c0}+f^0_{os})$ of the primary carrier offset value $f^0_{os}$ and the known primary carrier frequency $f_{c0}$ is substantially equal to a sum $(f_{c1}+f^1_{os})$ of the secondary carrier offset value $f^1_{os}$ and the known secondary carrier frequency $f_{c1}$, and the carrier power levels $P_0$ and $P_1$ of the primary baseband signal and the secondary baseband signal are substantially the same, that is, $f_{c0}+f^0_{os} \approx f_{c1}+f^1_{os}$ and $P_0 \approx P_1$, in step S643, the carrier offset coordinator 580 adjusts the primary feedback signal $f^0_{fb}$ and the secondary feedback signal $f^1_{fb}$ as one of the primary carrier offset value $f^0_{os}$ and the secondary carrier offset value $f^1_{os}$ (e.g., the secondary carrier offset value $f^1_{os}$). Afterward, in step S644, the primary demodulation apparatus 540 and the secondary demodulation apparatus 560 respectively perform the frequency calibration operation on the transmission signal S according to the known primary carrier frequency (i.e., the center frequency $f_{c0}$), the known secondary carrier frequency (i.e., the center frequency $f_{c1}$), the primary feedback signal $f^0{}_{fb}$ and the secondary feedback signal $f^1{}_{fb}$ so as to obtain a first calibrated primary baseband signal and a first calibrated secondary baseband signal. Additionally, in step S645, the primary demodulation apparatus 540 and the secondary demodulation apparatus 560 respectively calculate carrier power level $P_0$ of the first calibrated primary baseband signal and carrier power level $P_1$ of the first calibrated secondary baseband signal using the primary power calculator 545 and the secondary power calculator 565.

In step S646, the carrier offset coordinator 580 compares the signal carrier power level $P_0$ of the first calibrated primary baseband and the carrier power level $P_1$ of the first calibrated secondary baseband signal. If determining that the signal carrier power level $P_0$ of the first calibrated primary baseband is greater than the carrier power level $P_1$ of the first calibrated secondary baseband signal, i.e., $P_0 > P_1$, in step S647, the carrier offset coordinator 580 no longer adjusts the primary feedback signal $f^0{}_{fb}$ and the secondary feedback signal $f^1{}_{fb}$, and the primary demodulation apparatus 540 and the secondary demodulation apparatus 560 demodulate the first calibrated primary baseband signal and the first calibrated secondary baseband signal to obtain the audio signals from the transmission signal S. Otherwise, if determining that the signal carrier power level $P_0$ of the first calibrated primary baseband is not greater than the carrier power level $P_1$ of the first calibrated secondary baseband signal, in step S648, the carrier offset coordinator 580 adjusts the primary feedback signal $f^0{}_{fb}$ and the secondary feedback signal $f^1{}_{fb}$ as the other of the primary carrier offset value $f^0{}_{os}$ and the secondary carrier offset value $f^1{}_{os}$ (e.g., the primary carrier offset value $f^0{}_{os}$).

In step S649, the primary demodulation apparatus 540 and the secondary demodulation apparatus 560 respectively perform the frequency calibration operation on the transmission signal S according to the known primary carrier frequency (i.e., the center frequency $f_{c0}$), the known secondary carrier frequency (i.e., the center frequency $f_{c1}$), the primary feedback signal $f^0{}_{fb}$ and the secondary feedback signal $f^1{}_{fb}$ and using mixers 542 and 562, low-pass filters 544 and 564 so as to obtain a second calibrated primary baseband signal and a second calibrated secondary baseband signal. Then, in step S650, the primary power calculator 545 and the secondary power calculator 565 calculate a carrier power level $P_0$ of the second calibrated primary baseband signal and a carrier power level $P_1$ of the second calibrated secondary baseband signal, and in step S651, the carrier offset coordinator 580 compares the carrier power level $P_0$ of the second calibrated primary baseband signal with the carrier power level $P_1$ of the second calibrated secondary baseband signal. If the carrier offset coordinator 580 determines that the carrier power level $P_0$ of the second calibrated primary baseband signal is greater than the carrier power level $P_1$ of the second calibrated secondary baseband signal, i.e., $P_0 > P_1$, in step S652, the primary demodulation apparatus 540 and the secondary demodulation apparatus 560 respectively demodulate the second calibrated primary baseband signal and the second calibrated secondary baseband signal to obtain the audio signals from the transmission signal S. However, if determining that the carrier power level $P_0$ of the second calibrated primary baseband signal is not greater than the carrier power level $P_1$ of the second calibrated secondary baseband signal, in step S653, the carrier offset coordinator 580 adjusts the primary feedback signal $f^0{}_{fb}$ and the secondary feedback signal $f^1{}_{fb}$ as 0 and returns to step S620 to perform again the carrier frequency offset calibration method. Differing from the carrier frequency offset calibration method illustrated in FIG. 5, in the present embodiment, the carrier offset coordinator 580 further determines whether the carrier frequency offset does not exist in the transmission signal S or has been correctly calibrated by comparing the carrier power levels $P_0$ and $P_1$ of the baseband signals (e.g., comparing the primary baseband signal with the secondary baseband signal, the first calibrated primary baseband signal with the first calibrated secondary baseband signal, and the second calibrated primary baseband signal with the second calibrated secondary baseband signal). The rest of steps of the carrier frequency offset calibration method and the rest of structures of the carrier frequency offset calibration system of the present embodiment may refer to the descriptions with respect to the carrier frequency offset calibration method and the rest structures of the carrier frequency offset calibration system illustrated in FIGS. 2 to 5, and will not be repeatedly described hereinafter.

Figure 8:
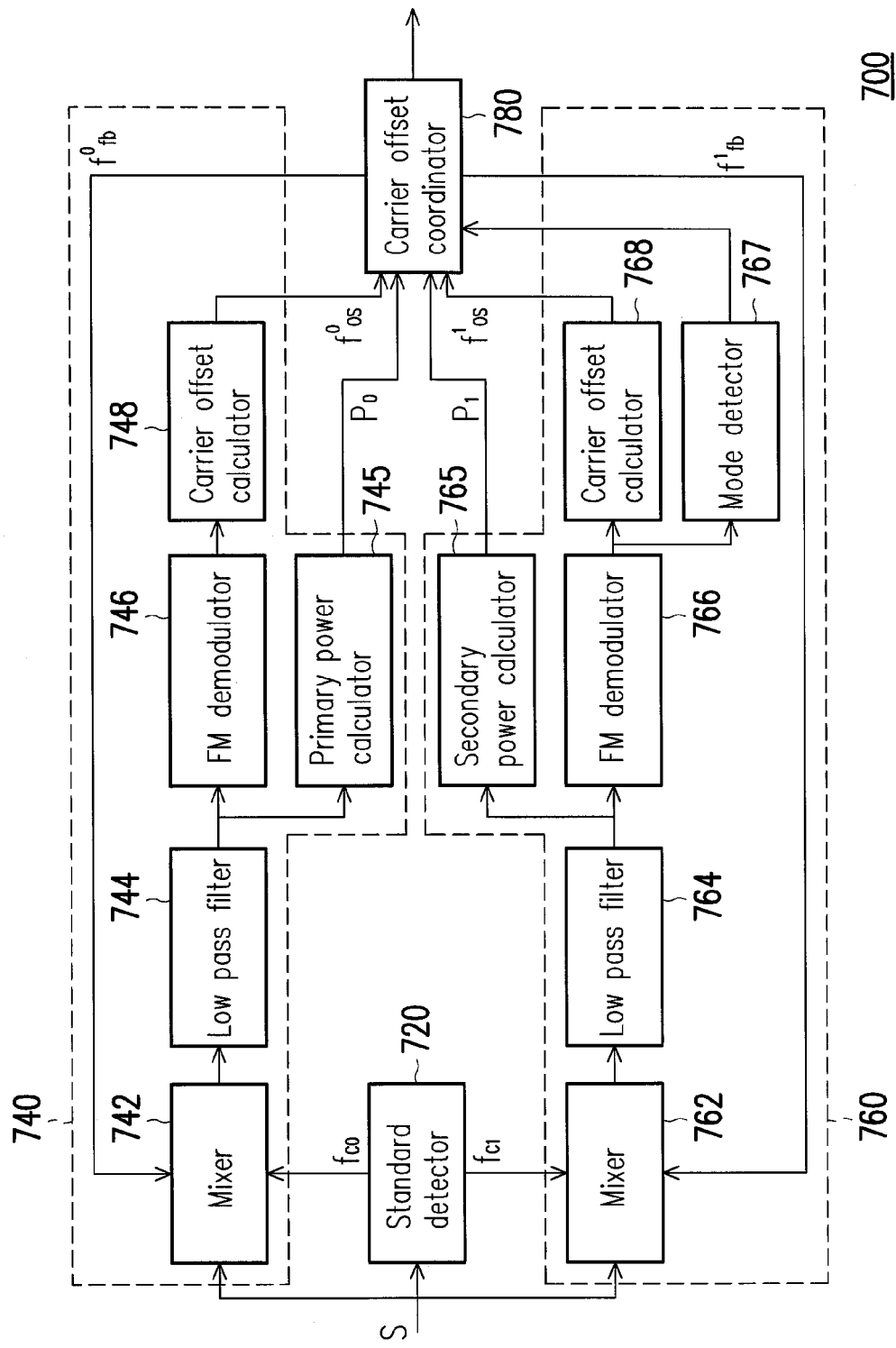
FIG. 8 is a schematic diagram of a carrier frequency offset calibration system according to another embodiment of the invention.
Figure 9A:
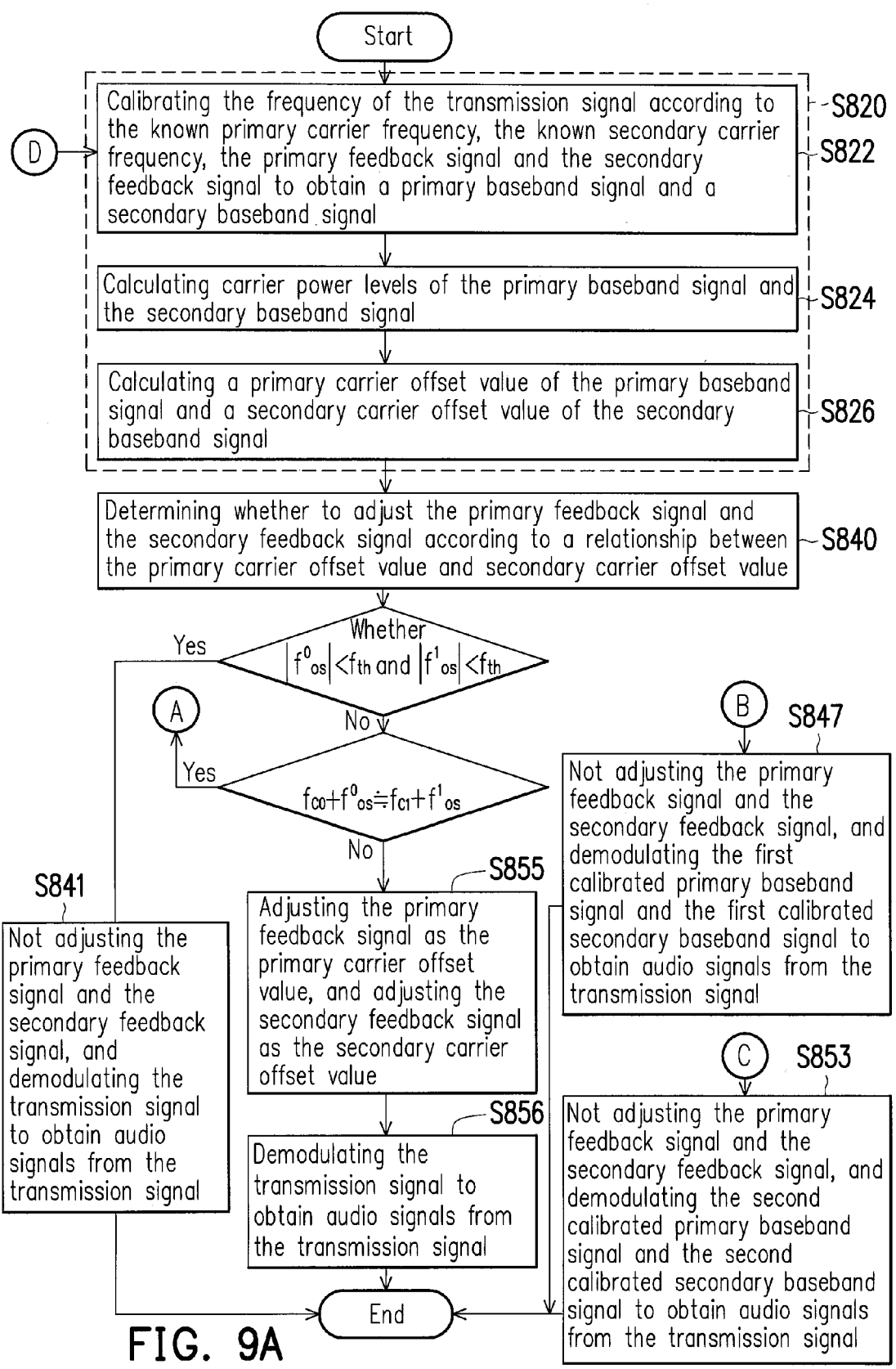
FIGS. 9A to 9B are detailed flowcharts of a carrier frequency offset calibration method according to another embodiment of the invention.
Figure 9B:
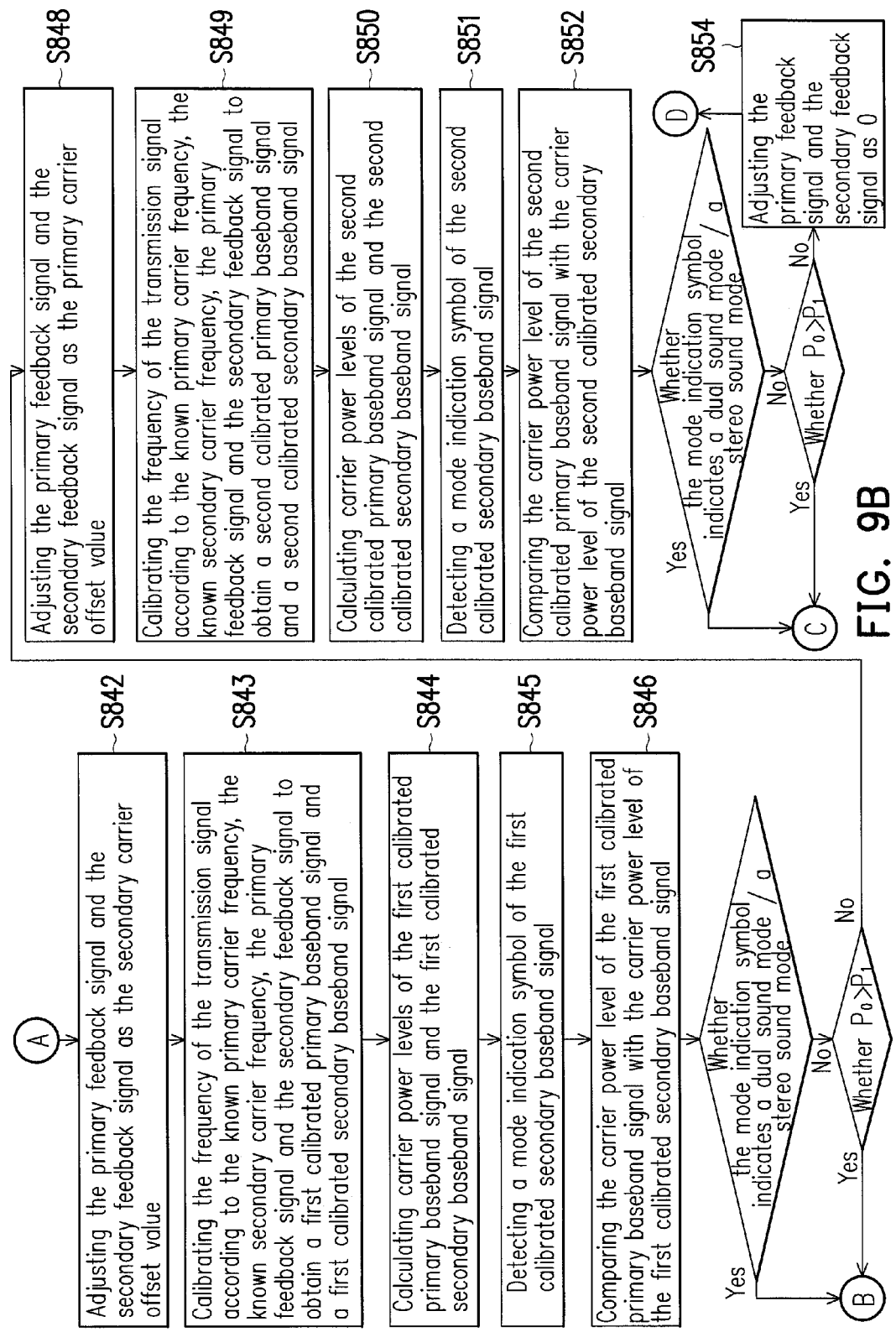

FIG. 8 is a schematic diagram of a carrier frequency offset calibration system 700 according to another embodiment of the invention. FIGS. 9A to 9B are detailed flowcharts of a carrier frequency offset calibration method according to another embodiment of the invention. The embodiment illustrated in FIG. 8 and FIGS. 9A to 9B may be inferred with reference to the descriptions with respect to FIGS. 1 to 7B. With reference to FIG. 8 and FIGS. 9A to 9B, in the carrier frequency offset calibration system 700, a primary demodulation apparatus 740 further includes a primary power calculator 745, and a secondary demodulation apparatus 760 further includes a secondary power calculator 765 and mode and a mode detector 767.

The steps S820, S822, S824, S826, S840, S841, S855 and S856 illustrated in FIG. 9A may be inferred with reference to the descriptions with respect to steps S620, S622, S624, S626, S640, S642, S654 and S655 illustrated in FIG. 7A. The steps S842, S843, S844, S846, S848, S849, S850, S852 and S854 illustrated in FIG. 9B may be inferred with reference to the descriptions with respect to steps S643, S644, S645, S646, S648, S649, S650, S651 and S653 illustrated in FIG. 7B. Being compared with the carrier frequency offset calibration system 500 and the carrier frequency offset calibration method illustrated in FIGS. 6 and 7A to 7B, in step S845 of the carrier frequency offset calibration method of the present embodiment, the mode detector 767 detects a mode indication symbol of the first calibrated secondary baseband signal. If determining that the mode indication symbol indicates the first calibrated secondary baseband signal in a dual sound mode or a stereo sound mode, the carrier offset coordinator 780 does not adjust the primary feedback signal $f^0{}_{fb}$ and the secondary feedback signal $f^1{}_{fb}$, and in step S847, the primary demodulation apparatus 740 and the secondary demodulation apparatus 760 demodulate the first calibrated primary baseband signal and the first calibrated secondary baseband signal to obtain the audio signals from the transmission signal S. If determining that the mode indication symbol indicates the first calibrated secondary baseband signal not in the dual sound mode or the stereo sound mode, but that the carrier power level $P_0$ of the first calibrated primary baseband signal is greater than the carrier power level $P_1$ of the first calibrated secondary baseband signal, i.e., $P_0 > P_1$, the carrier offset coordinator 780 likewise does not adjust the primary feedback signal $f^0{}_{fb}$ and the secondary feedback signal $f^1{}_{fb}$, and in step S847, the primary demodulation apparatus 740 and the secondary demodulation apparatus 760 demodulate the first calibrated primary baseband signal and the first calibrated secondary baseband signal to obtain the audio signals from the transmission signal S. If determining that the mode indication symbol of the first calibrated secondary baseband signal indicates the first calibrated secondary baseband signal not in the dual sound mode or the stereo sound mode, and that the carrier power level $P_0$ of the first calibrated primary baseband signal is not greater than the carrier power level $P_1$ of the first calibrated secondary baseband signal, in step S848, the carrier offset coordinator 780 adjusts the primary feedback signal $f^0{}_{fb}$ and the secondary feedback signal $f^1{}_{fb}$ as the primary carrier offset value $f^0{}_{os}$. In the present embodiment, the carrier offset coordinator 780 first adjusts the primary feedback signal $f^0{}_{fb}$ and the secondary feedback signal $f^1{}_{fb}$ as the secondary carrier offset value $f^1{}_{os}$ in step S842, and then adjusts the primary feedback signal $f^0{}_{fb}$ and the secondary feedback signal $f^1{}_{fb}$ as the primary carrier offset value $f^0{}_{os}$ in step S848. However, the way of adjusting the primary feedback signal $f^0{}_{fb}$ and the secondary feedback signal $f^1{}_{fb}$ is not limited in the invention.

In detail, the mode indication symbol is generally configured to indicate the sound mode of the audio signals of the transmission signal S. Thus, if the mode detector 767 detects that the mode indication symbol is in the first calibrated secondary baseband signal and indicates the sound mode of the audio signals in the first calibrated secondary baseband signal in the dual sound mode or the stereo sound mode, it represents that at least the first calibrated secondary baseband signal correctly corresponds to the frequency of the secondary carrier (i.e., the secondary channel signal $S_1$.) in the transmission signal S. In this case, the first calibrated primary baseband signal and the first calibrated secondary baseband signal may be considered as the carrier frequency offset therebetween being calibrated, and the first calibrated primary baseband signal and the first calibrated secondary baseband signal may be further demodulated to obtain the audio signals from the transmission signal S.

Similarly, in step S851 of the carrier frequency offset calibration method, the mode detector 767 detects the mode indication symbol in the second calibrated secondary baseband signal. If the mode indication symbol indicates the second calibrated secondary baseband signal in the dual sound mode or the stereo sound mode, the carrier offset coordinator 780 likewise does not adjust the primary feedback signal $f^0{}_{fb}$ and the secondary feedback signal $f^1{}_{fb}$, and in step S853, the primary demodulation apparatus 740 and the secondary demodulation apparatus 760 demodulate the second calibrated primary baseband signal and the second calibrated secondary baseband signal to obtains the audio signals. If the carrier offset coordinator 780 determines that the mode indication symbol indicates the second calibrated secondary baseband signal not in the dual sound mode or the stereo sound mode, but that the carrier power level $P_0$ of the carrier power level of the second calibrated primary baseband signal $P_0$ is greater than the carrier power level $P_1$ of the carrier power level of the second calibrated secondary baseband signal $P_1$, the carrier offset coordinator 780 likewise does not adjust the primary feedback signal $f^0{}_{fb}$ and the secondary feedback signal $f^1{}_{fb}$, and in step S853, the primary demodulation apparatus 740 and the secondary demodulation apparatus 760 demodulate the second calibrated primary baseband signal and the second calibrated secondary baseband signal to obtain the audio signals from the transmission signal S. If the carrier offset coordinator 780 determines that the mode indication symbol of the second calibrated secondary baseband signal indicates the second calibrated secondary baseband signal not in the dual sound mode or the stereo sound mode, and that the carrier power level $P_0$ of the second calibrated primary baseband signal is greater than the carrier power level $P_1$ of the carrier power level of the second calibrated secondary baseband signal $P_1$, in step S854, the carrier offset coordinator 780 adjusts the primary feedback signal $f^0{}_{fb}$ and the secondary feedback signal $f^1{}_{fb}$ as 0, and the carrier frequency offset calibration method returns to step S820. The rest of steps of the carrier frequency offset calibration method and the rest of structures of the carrier frequency offset calibration system of the present embodiment may refer to the descriptions with respect to the carrier frequency offset calibration method and the rest structures of the carrier frequency offset calibration system illustrated in FIGS. 2 to 8, and will not be repeatedly described hereinafter.

Figure 10A:
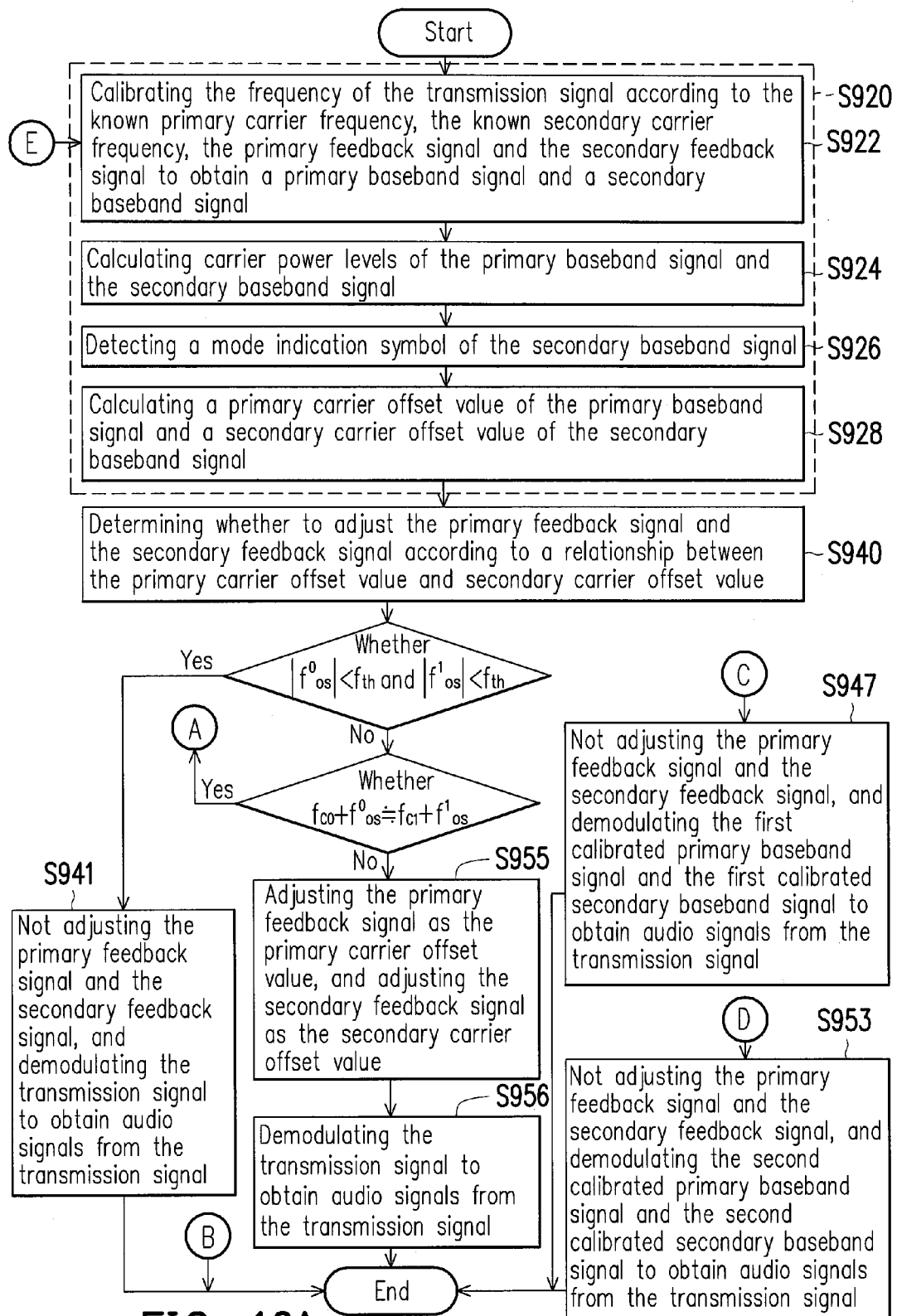
FIGS. 10A to 10B are flowcharts of a carrier frequency offset calibration method according to another embodiment of the invention.
Figure 10B:
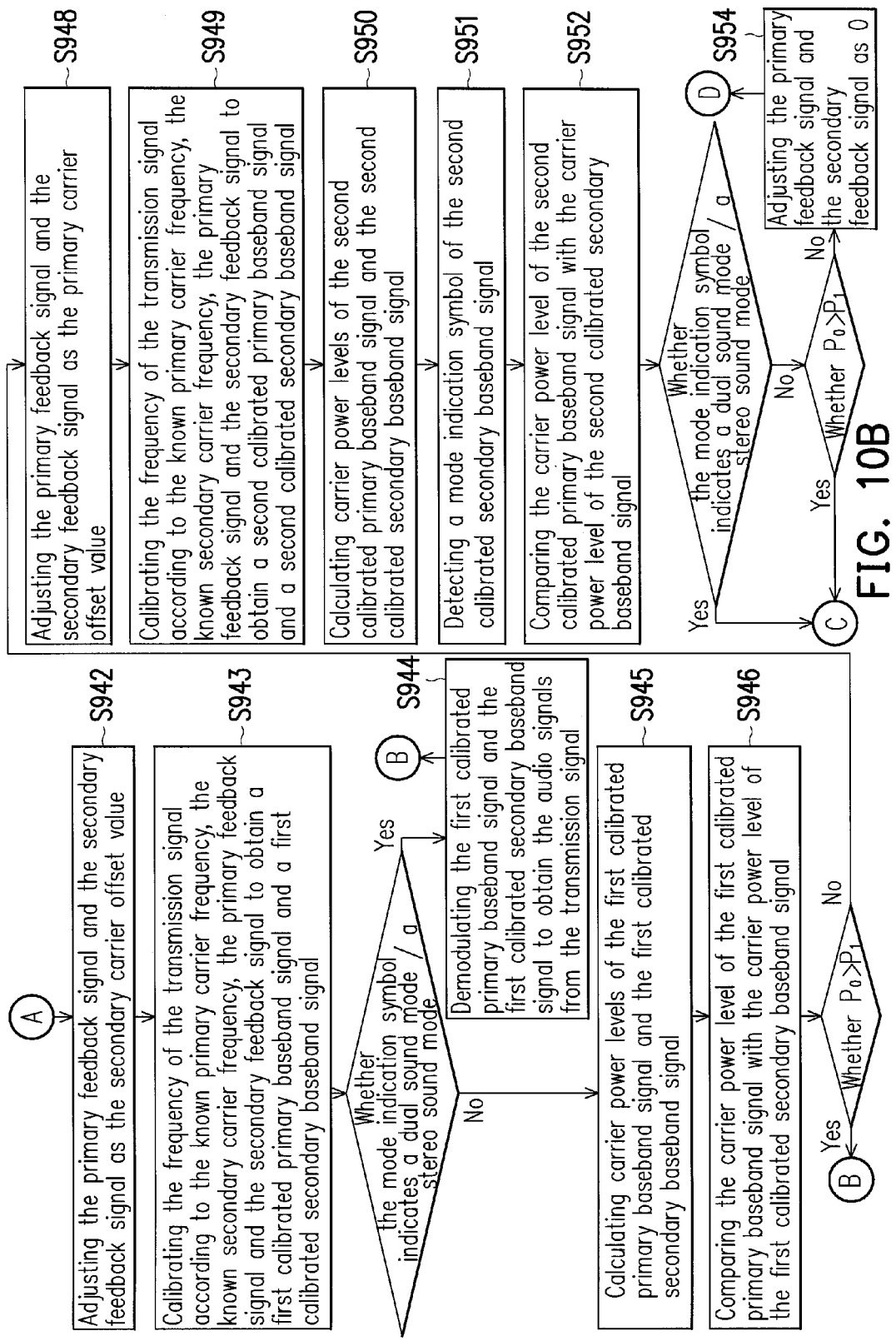

FIGS. 10A to 10B are flowcharts of a carrier frequency offset calibration method according to another embodiment of the invention. The carrier frequency offset calibration method illustrated in FIGS. 10A to 10B may be similarly applied to the carrier frequency offset calibration system 700 illustrated in FIG. 8 though the flows may be different. The steps S920, S922, S924, S928, S940, S941, S947, S953, S955 and S956 illustrated in FIG. 10A may be inferred with reference to the descriptions with respect to steps S820, S822, S824, S826, S840, S841, S847, S853, S855 and S856 illustrated in FIG. 9A. The steps S942, S943, S945, S946, S948, S949, S950, S951, S952 and S954 illustrated in FIG. 10B may be inferred with reference to the descriptions with respect to steps S842, S843, S844, S846, S848, S849, S850, S851, S852 and S854 illustrated in FIG. 9B. In step S926, the secondary demodulation apparatus 760 detects a mode indication symbol of the secondary baseband signal using the mode detector 767. If the carrier offset coordinator 780 determines that the absolute value of the primary carrier offset value $f^0{}_{os}$ of the absolute value of the secondary carrier offset value $f^1{}_{os}$ is not greater than the frequency offset threshold $f_{th}$, and the sum $(f_{c0}+f^0{}_{os})$ of the primary carrier offset value $f^0{}_{os}$ and the known primary carrier frequency $f_{c0}$ is substantially equal to the sum $(f_{c1}+f^1{}_{os})$ of the secondary carrier offset value $f^1{}_{os}$ and the known secondary carrier frequency $f_{c1}$, in step S942, the carrier offset coordinator 780 adjusts the primary feedback signal $f^1{}_{fb}$ and the secondary feedback signal $f^1{}_{fb}$ as the secondary carrier offset value $f^1{}_{os}$. In step S943, the primary demodulation apparatus 740 and the secondary demodulation apparatus 760 respectively perform the frequency offset calibration operation on the transmission signal S according to the known primary carrier frequency (i.e., the center frequency $f_{c0}$), the known secondary carrier frequency (i.e., the center frequency $f_{c1}$), the primary feedback signal $f^0{}_{fb}$ and the secondary feedback signal $f^1{}_{fb}$ to obtain the first calibrated primary baseband signal and the first calibrated secondary baseband signal.

If the mode indication symbol detected in step S926 indicates the secondary baseband signal in the dual sound mode or the stereo sound mode, in step S944, the primary demodulation apparatus 740 and the secondary demodulation apparatus 760 demodulate the first calibrated primary baseband signal and the first calibrated secondary baseband signal to obtain the audio signals from the transmission signal S. Otherwise, if the mode indication symbol detected in step S926 indicates the secondary baseband signal not in the dual sound mode or the stereo sound mode, in step S945, the primary demodulation apparatus 740 and the secondary demodulation apparatus 760 calculate the carrier power levels $P_0$ and $P_1$ of the first calibrated primary baseband signal and the first calibrated secondary baseband signal using the primary power calculator 745 and the secondary power calculator 765, and in step S946, the carrier offset coordinator 780 compares the carrier power level $P_0$ of the first calibrated primary baseband signal with the carrier power level $P_1$ of the first calibrated secondary baseband signal. If determining that the carrier power level $P_0$ of the first calibrated primary baseband signal is greater than the carrier power level $P_1$ of the first calibrated secondary baseband signal, i.e., $P_0 > P_1$, the carrier offset coordinator 780 does not adjust the primary feedback signal $f^0{}_{fb}$ and the secondary feedback signal $f^1{}_{fb}$, and in step S947, the primary demodulation apparatus 740 and the secondary demodulation apparatus 760 demodulate the first calibrated primary baseband signal and the first calibrated secondary baseband signal to obtain the audio signals from the transmission signal S. In contrary, if determining that the carrier power level $P_0$ of the first calibrated primary baseband signal is not greater than the carrier power level $P_1$ of the first calibrated secondary baseband signal, in step S948, the carrier offset coordinator 780 adjusts the primary feedback signal $f^0{}_{fb}$ and the secondary feedback signal $f^1{}_{fb}$ as the primary carrier offset value $f^0{}_{os}$. Steps S949 through S954 of the carrier frequency offset calibration method may refer to steps $S_{84}$ through S854 illustrated in FIG. 9, which will not be repeated. Being compared with the carrier frequency offset calibration method illustrated in FIG. 9, in the present embodiment, the mode indication symbol of the secondary baseband signal is detected before the feedback step. In the present embodiment, the sequence for the carrier offset coordinator 780 to adjust the primary feedback signal $f^0{}_{fb}$ and the secondary feedback signal $f^1{}_{fb}$ to as the secondary carrier offset value $f^1{}_{os}$ or the primary carrier offset value $f^0{}_{os}$ does not have to be adjusting the secondary carrier offset value $f^1{}_{os}$ first and then the primary carrier offset value $f^0{}_{os}$. In other words, the way for adjusting the primary feedback signal $f^0{}_{fb}$ and the secondary feedback signal $f^1{}_{fb}$ is not limited to the aforementioned sequence. Moreover, the rest part of descriptions with respect to the carrier frequency offset calibration system and the carrier frequency offset calibration method of the present embodiment can refer to those with respect to the carrier frequency offset calibration system and the carrier frequency offset calibration method illustrated in FIG. 2 to 9B and will not be repeated hereinafter.

Figure 11:
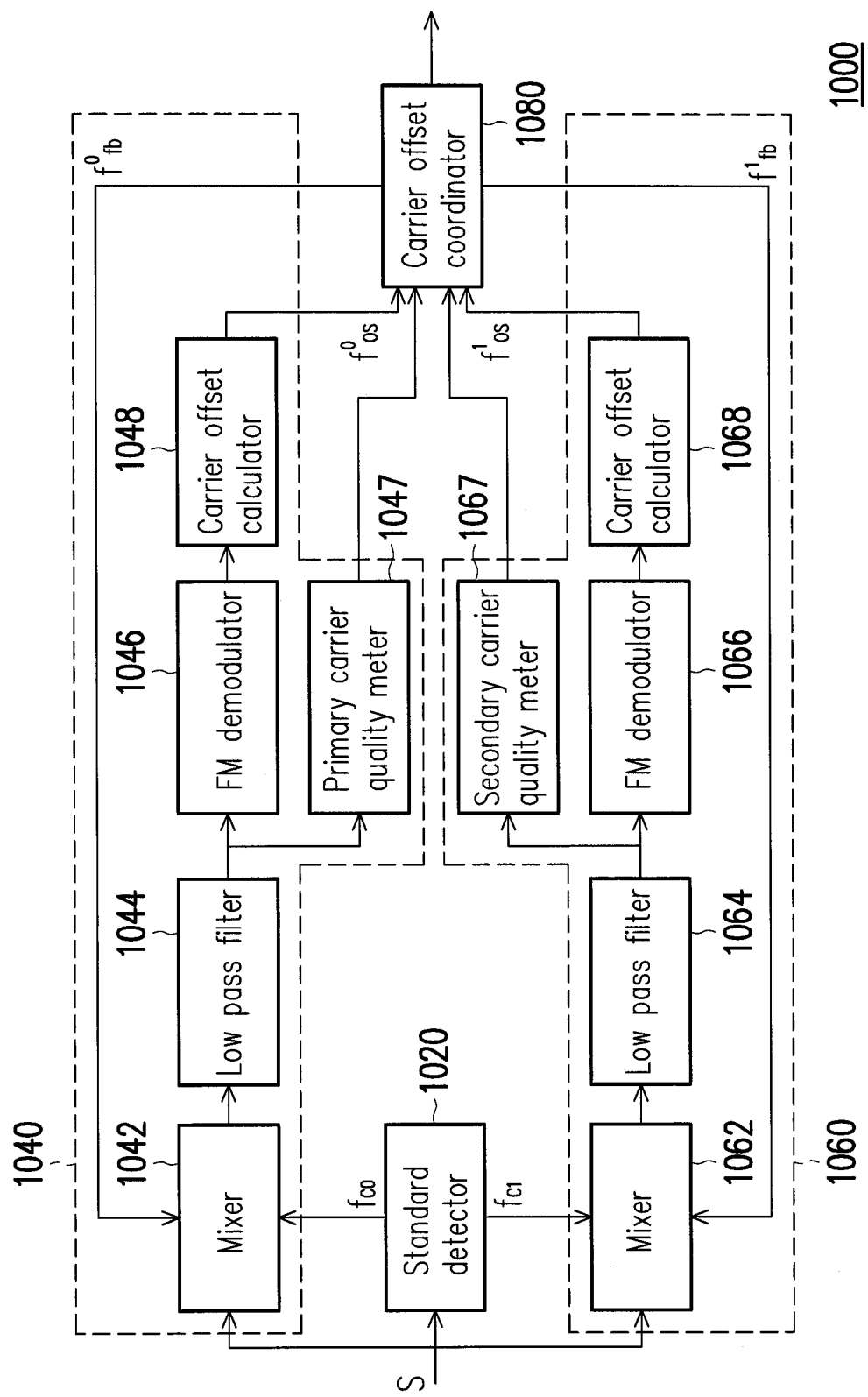
FIG. 11 is a schematic diagram of a carrier frequency offset calibration system according to another embodiment of the invention.
Figure 12A:
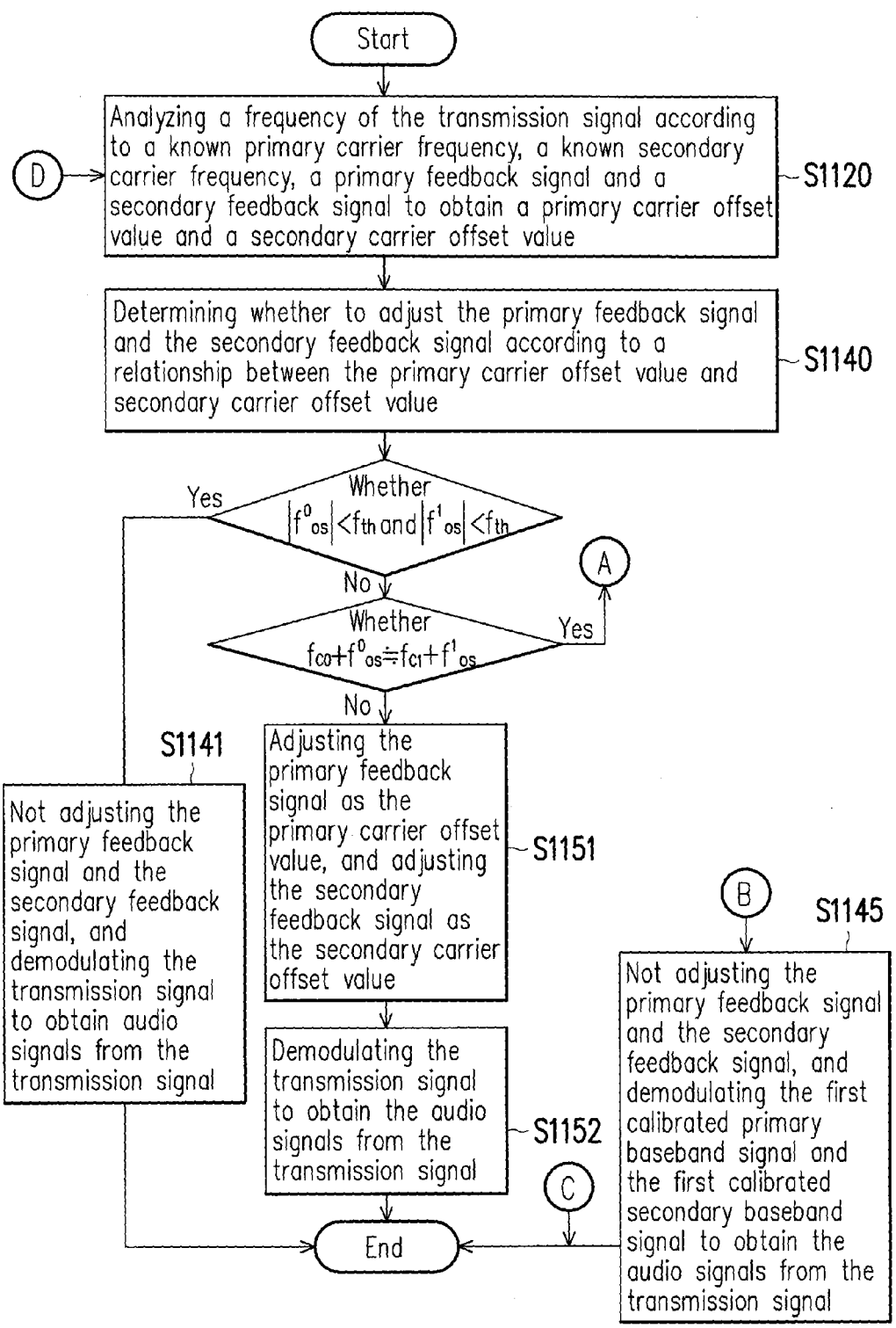
FIGS. 12A to 12B are flowcharts of a carrier frequency offset calibration method according to another embodiment of the invention.
Figure 12B:
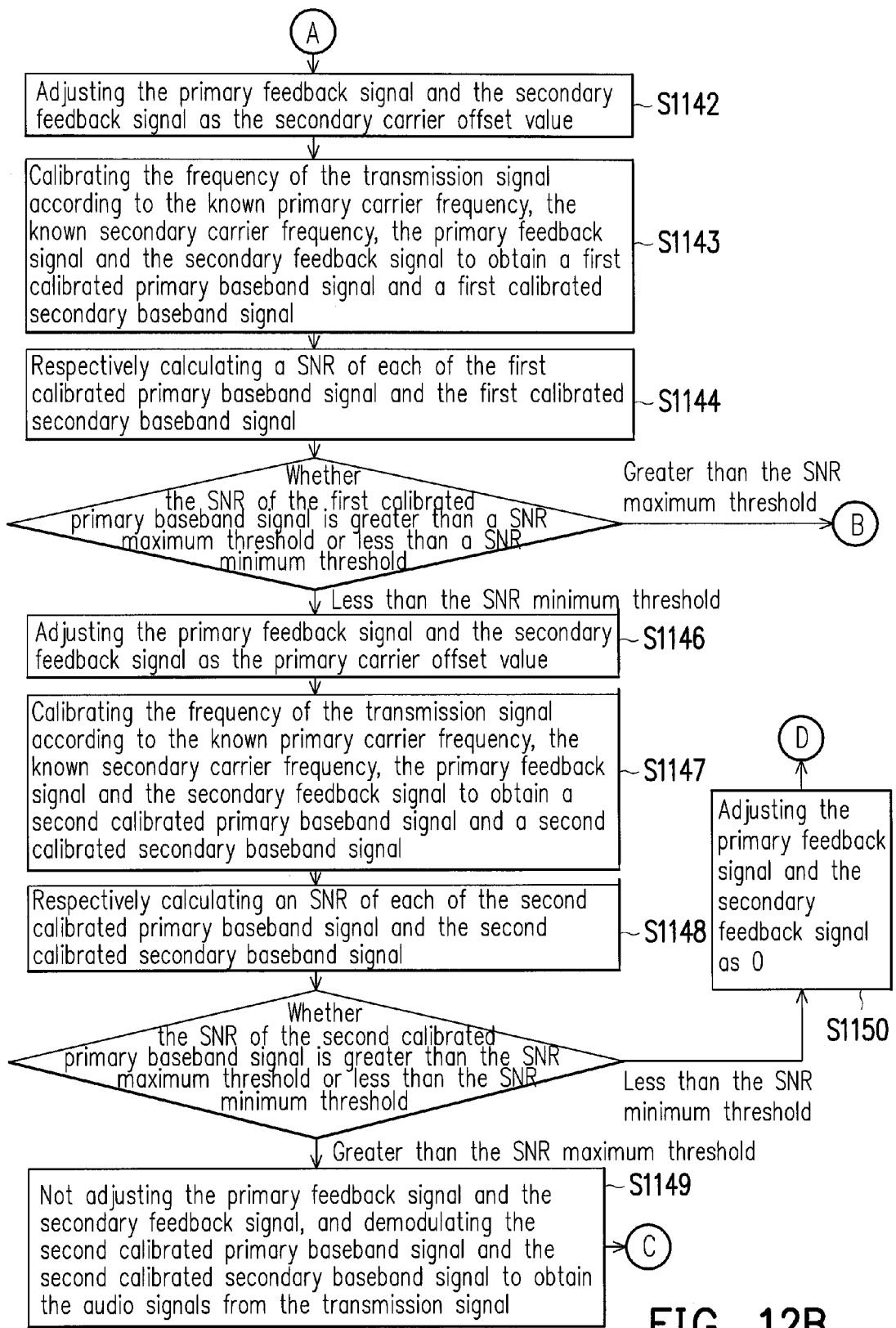

FIG. 11 is a schematic diagram of a carrier frequency offset calibration system 1000 according to another embodiment of the invention. FIGS. 12A to 12B are flowcharts of a carrier frequency offset calibration method according to another embodiment of the invention. The embodiment illustrated in FIG. 11 and FIGS. 12A to 12B may be inferred with reference to the descriptions with respect to FIGS. 1 to 10B. With reference to FIG. 11 and FIGS. 12A-12B, a primary demodulation apparatus 1040 and a secondary demodulation apparatus 1060 further include a primary carrier quality meter 1047 and a secondary carrier quality meter 1067, respectively. In the present embodiment, the carrier frequency offset calibration system 1000 and the carrier frequency offset calibration method further determine whether to adjust the primary feedback signal $f^0{}_{fb}$ and the secondary feedback signal $f^1{}_{fb}$ utilizing a signal to noise ratio (SNR) measuring method. In step S1142, if determining that the absolute value of the primary carrier offset value $f^0{}_{os}$ or the absolute value of the secondary carrier offset value $f^1{}_{os}$ is not less than the frequency offset threshold, and the sum $(f_{c0}+f^0{}_{os})$ of the primary carrier offset value $f^0{}_{os}$ and the known primary carrier frequency $f_{c0}$ is substantially equal to the sum $(f_{c1}+f^1{}_{os})$ of the secondary carrier offset value $f^1{}_{os}$ and the known secondary carrier frequency $f_{c1}$, a carrier offset coordinator 1080 adjusts the primary feedback signal $f^0{}_{fb}$ and the secondary feedback signal $f^1{}_{fb}$ as the secondary carrier offset value $f^1{}_{os}$. In step S1143, the primary demodulation apparatus 1040 and the secondary demodulation apparatus 1060 respectively perform the frequency offset calibration operation on the transmission signal S according to the known primary carrier frequency (i.e., the center frequency $f_{c0}$), the known secondary carrier frequency (i.e., the center frequency $f_{c1}$), the primary feedback signal $f^0{}_{fb}$ and the secondary feedback signal $f^1{}_{fb}$ to obtain the first calibrated primary baseband signal and the first calibrated secondary baseband signal. Thereafter, in step S1144, the primary demodulation apparatus 1040 further calculates an SNR of the first calibrated primary baseband signal using the primary carrier quality meter 1047, and the secondary demodulation apparatus 1060 further calculates an SNR of the first calibrated secondary baseband signal using the secondary carrier quality meter 1067. If determining that the SNR of the first calibrated primary baseband signal is greater than an SNR maximum threshold, in step S1145, the carrier offset coordinator 1080 does not adjust the primary feedback signal $f^0{}_{fb}$ and the secondary feedback signal $f^1{}_{fb}$, and the primary demodulation apparatus 1040 and the secondary demodulation apparatus 1060 demodulate the first calibrated primary baseband signal and the first calibrated secondary baseband signal to obtain the audio signals. If determining that the SNR of the first calibrated primary baseband signal is less than an SNR minimum threshold, in steps S1146 through S1148, the carrier offset coordinator 1080 adjusts the primary feedback signal $f^0{}_{fb}$ and the secondary feedback signal $f^1{}_{fb}$ as the primary carrier offset value $f^0{}_{os}$, and the frequencies of the primary demodulation apparatus 1040 and the secondary demodulation apparatus 1060 are calibrated according to the known primary carrier frequency (i.e., the center frequency $f_{c0}$), the known secondary carrier frequency (i.e., the center frequency $f_{c1}$), the primary feedback signal $f^0{}_{fb}$ and the secondary feedback signal $f^1{}_{fb}$ to obtain the second calibrated primary baseband signal and the second calibrated secondary baseband signal. Additionally, the primary demodulation apparatus 1040 further calculates an SNR of the second calibrated primary baseband signal using the primary carrier quality meter 1047, and the secondary demodulation apparatus 1060 further calculates an SNR of the second calibrated secondary baseband signal using the secondary carrier quality meter 1067.

In detail, if the SNR of the detected first calibrated primary baseband signal is greater than the SNR maximum threshold, it represents that the first calibrated primary baseband signal contains the audio signals of the transmission signal S. In contrary, if the SNR of the first calibrated primary baseband signal is less than the SNR minimum threshold, it represents that the first calibrated primary baseband signal contains only noise. In other words, by measuring the SNR of the first calibrated primary baseband signal, whether to perform the carrier frequency offset calibration operation on the transmission signal S can be confirmed by the carrier frequency offset calibration system 1000 and the carrier frequency offset calibration method. The SNR maximum threshold and the SNR minimum threshold may be changed with the environment and the setting, and are not limited in the invention.

Similarly, if determining that the SNR of the second calibrated secondary baseband signal is greater than the SNR maximum threshold, in step S1149, the carrier offset coordinator 1080 does not adjust the primary feedback signal $f^0{}_{fb}$ and the secondary feedback signal $f^1{}_{fb}$, and the primary demodulation apparatus 1040 and the secondary demodulation apparatus 1060 demodulate the second calibrated primary baseband signal and the second calibrated secondary baseband signal to obtain the audio signals from the transmission signal S. If the SNR of the second calibrated secondary baseband signal is less than the SNR minimum threshold, the carrier frequency offset calibration method returns to step S1120. The rest part of descriptions with respect to the carrier frequency offset calibration system and the carrier frequency offset calibration method of the present embodiment can refer to those with respect to the carrier frequency offset calibration system and the carrier frequency offset calibration method illustrated in FIGS. 2 to 10B and will not be repeated hereinafter.

To sum up, in the carrier frequency offset calibration method and the carrier frequency offset calibration system provided by the invention, by detecting various parameter values in the transmission signal, such as the carrier frequency offset values, the carrier power levels, the mode indication symbols or the SNR values, whether the transmission signal needs to be performed with the carrier frequency offset calibration operation can be determined, and whether the transmission signal with the carrier frequency offset calibrated can be correctly demodulated can be further examined, and thereby, the audio signals can be obtained from the transmission signal. Accordingly, by the carrier frequency offset calibration method and the carrier frequency offset calibration system, the wrong signal demodulation due to serious carrier frequency offsets can be prevented.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A carrier frequency offset calibration method, adapted to a carrier frequency offset calibration system to calibrate caier frequency offsets of a transmission signal comprising a primary carrier and a secondary carrier, the method comprising:
analyzing a frequency of the transmission signal according to a known primary carrier frequency, a known secondary carrier frequency, a primary feedback signal and a secondary feedback signal to obtain a primary carrier offset value and a secondary carrier offset value, wherein the analyzing step comprises:
calibrating the frequency of the transmission signal according to the known primary carrier frequency, the known secondary carrier frequency, the primary feedback signal and the secondary feedback signal to obtain a primary baseband signal and a secondary baseband signal;
calculating carrier power levels of the primary baseband signal and the secondary baseband signal; and
calculating the primary carrier offset value of the primary baseband signal and the secondary carrier offset value of the secondary baseband signal; and
determining whether to adjust the primary feedback signal and the secondary feedback signal according to a relationship between the primary carrier offset value and the secondary carrier offset value, wherein the determining step comprises:
if an absolute value of the primary carrier offset value or an absolute value of the secondary carrier offset value is not less than a frequency offset threshold, and if a sum of the primary carrier offset value and the known primary carrier frequency is substantially equal to a sum of the secondary carrier offset value and the known secondary carrier frequency, adjusting the primary feedback signal and the secondary feedback signal as the secondary carrier offset value.

2. The method according to claim 1, wherein the step of determining whether to adjust the primary feedback signal and the secondary feedback signal comprises:
if both an absolute value of the primary carrier offset value and an absolute value of the secondary carrier offset value are less than a frequency offset threshold, not adjusting the primary feedback signal and the secondary feedback signal and demodulating the transmission signal to obtain audio signals from the transmission signal.

3. The method according to claim 1, wherein the step of determining whether to adjust the primary feedback signal and the secondary feedback signal comprises:
if an absolute value of the primary carrier offset value or an absolute value of the secondary carrier offset value is not less than a frequency offset threshold, and if a sum of the primary carrier offset value and the known primary carrier frequency is substantially equal to a sum of the secondary carrier offset value and the known secondary carrier frequency, examining whether a test primary carrier offset value and a test secondary carrier offset value are set initial values;
if the test primary carrier offset value and the test secondary carrier offset value are the set initial values, recording the primary carrier offset value and the secondary carrier offset value as the test primary carrier offset value and the test secondary carrier offset value, and adjusting the primary feedback signal and the secondary feedback signal as one of the test primary carrier offset value and the test secondary carrier offset value according to a flag value; and
if the test primary carrier offset value and the test secondary carrier offset value are not the set initial values, adjusting the primary feedback signal and the secondary feedback signal as one of the test primary carrier offset value and the test secondary carrier offset value according to the flag value.

4. The method according to claim 3, wherein the step of adjusting the primary feedback signal and the secondary feedback signal according to the flag value comprises:
if the flag value is 0, adjusting the primary feedback signal and the secondary feedback signal as one of the test primary carrier offset value and the test secondary carrier offset value, and re-setting the flag value as 1; and
if the flag value is 1, adjusting the primary feedback signal and the secondary feedback signal as the other of the test primary carrier offset value and the test secondary carrier offset value, and re-setting the flag value as 0.

5. The method according to claim 1, wherein the step of determining whether to adjust the primary feedback signal and the secondary feedback signal comprises:
if an absolute value of the primary carrier offset value or an absolute value of the secondary carrier offset value is not less than a frequency offset threshold, and if a sum of the primary carrier offset value and the known primary carrier frequency is not substantially equal to a sum of the secondary carrier offset value and the known secondary carrier frequency, adjusting the primary feedback signal as the primary carrier offset value and adjusting the secondary feedback signal as the secondary carrier offset value; and
demodulating the transmission signal to obtain audio signals from the transmission signal.

6. The method according to claim 1, whether the step of determining whether to adjust the primary feedback signal and the secondary feedback signal comprises:
comparing the carrier power level of the primary baseband signal with the carrier power level of the secondary baseband signal; and
if an absolute value of the primary carrier offset value or an absolute value of the secondary carrier offset value is not less than a frequency offset threshold, and if a sum of the primary carrier offset value and the known primary carrier frequency is substantially equal to a sum of the secondary carrier offset value and the known secondary carrier frequency, and if the carrier power level of the primary baseband signal is substantially equal to the carrier power level of the secondary baseband signal, adjusting the primary feedback signal and the secondary feedback signal as one of the primary carrier offset value and the secondary carrier offset value.

7. The method according to claim 6, wherein the step of determining whether to adjust the primary feedback signal and the secondary feedback signal further comprises:
calibrating the frequency of the transmission signal according to the known primary carrier frequency, the known secondary carrier frequency, the primary feedback signal and the secondary feedback signal to obtain a first calibrated primary baseband signal and a first calibrated secondary baseband signal;
calculating carrier power levels of the first calibrated primary baseband signal and the first calibrated secondary baseband signal;
comparing the carrier power level of the first calibrated primary baseband signal with the carrier power level of the first calibrated secondary baseband signal;
if the carrier power level of the first calibrated primary baseband signal is greater than the carrier power level of the first calibrated secondary baseband signal, demodulating the first calibrated primary baseband signal and the first calibrated secondary baseband signal to obtain audio signals from the transmission signal;
if the carrier power level of the first calibrated primary baseband signal is not greater than the carrier power level of the first calibrated secondary baseband signal, adjusting the primary feedback signal and the secondary feedback signal as the other of the primary carrier offset value and the secondary carrier offset value;
calibrating the frequency of the transmission signal according to the known primary carrier frequency, the known secondary carrier frequency, the primary feedback signal and the secondary feedback signal to obtain a second calibrated primary baseband signal and a second calibrated secondary baseband signal;
calculating carrier power levels of the second calibrated primary baseband signal and the second calibrated secondary baseband signal;
comparing the carrier power level of the second calibrated primary baseband signal with the carrier power level of the second calibrated secondary baseband signal;
if the carrier power level of the second calibrated primary baseband signal is greater than the carrier power level of the second calibrated secondary baseband signal, demodulating the second calibrated primary baseband signal and the second calibrated secondary baseband signal to obtain audio signals from the transmission signal; and
if the carrier power level of the second calibrated primary baseband signal is not greater than the carrier power level of the second calibrated secondary baseband signal, adjusting the primary feedback signal and the secondary feedback signal as 0.

8. The method according to claim 1, wherein the step of determining whether to adjust the primary feedback signal and the secondary feedback signal further comprises:
calibrating the frequency of the transmission signal according to the known primary carrier frequency, the known secondary carrier frequency, the primary feedback signal and the secondary feedback signal to obtain a first calibrated primary baseband signal and a first calibrated secondary baseband signal;
calculating carrier power levels of the first calibrated primary baseband signal and the first calibrated secondary baseband signal;
detecting a mode indication symbol of the first calibrated secondary baseband signal;
comparing the carrier power level of the first calibrated primary baseband signal with the carrier power level of the first calibrated secondary baseband signal;
if the mode indication symbol of the first calibrated secondary baseband signal indicates that the first calibrated secondary baseband signal is in a dual sound mode or a stereo sound mode, not adjusting the primary feedback signal and the secondary feedback signal, and demodulating the first calibrated primary baseband signal and the first calibrated secondary baseband signal to obtain audio signals from the transmission signal;
if the mode indication symbol of the first calibrated secondary baseband signal indicates that the first calibrated secondary baseband signal is not in the dual sound mode or the stereo sound mode, but the carrier power level of the first calibrated primary baseband signal is greater than the carrier power level of the first calibrated secondary baseband signal, not adjusting the primary feedback signal and the secondary feedback signal, and demodulating the first calibrated primary baseband signal and the first calibrated secondary baseband signal to obtain the audio signals from the transmission signal;
if the mode indication symbol of the first calibrated secondary baseband signal indicates that the first calibrated secondary baseband signal is not in the dual sound mode or the stereo sound mode, and if the carrier power level of the first calibrated primary baseband signal is not greater than the carrier power level of the first calibrated secondary baseband signal, adjusting the primary feedback signal and the secondary feedback signal as the primary carrier offset value;
calibrating the frequency of the transmission signal according to the known primary carrier frequency, the known secondary carrier frequency, the primary feedback signal and the secondary feedback signal to obtain a second calibrated primary baseband signal and a second calibrated secondary baseband signal;
calculating carrier power levels of the second calibrated primary baseband signal and the second calibrated secondary baseband signal;
detecting a mode indication symbol of the second calibrated secondary baseband signal;
comparing the carrier power level of the second calibrated primary baseband signal with the carrier power level of the second calibrated secondary baseband signal;
if the mode indication symbol of the second calibrated secondary baseband signal indicates that the second calibrated secondary baseband signal is in the dual sound mode or the stereo sound mode, not adjusting the primary feedback signal and the secondary feedback signal, and demodulating the second calibrated primary baseband signal and the second calibrated secondary baseband signal to obtain the audio signals from the transmission signal;
if the mode indication symbol of the second calibrated secondary baseband signal indicates that the second calibrated secondary baseband signal is not in the dual sound mode or the stereo sound mode, but the carrier power level of the second calibrated primary baseband signal is greater than the carrier power level of the second calibrated secondary baseband signal, not adjusting the primary feedback signal and the secondary feedback signal, and demodulating the second calibrated primary baseband signal and the second calibrated secondary baseband signal to obtain the audio signals from the transmission signal; and if the mode indication symbol of the second calibrated secondary baseband signal indicates that the second calibrated secondary baseband signal is not in the dual sound mode or the stereo sound mode, and if the carrier power level of the second calibrated primary baseband signal is not greater than the carrier power level of the second calibrated secondary baseband signal, adjusting the primary feedback signal and the secondary feedback signal as 0.

9. The method according to claim 1, wherein the step of analyzing the frequency of the transmission signal according to the known primary carrier frequency, the known secondary carrier frequency, the primary feedback signal and the secondary feedback signal to obtain the primary carrier offset value and the secondary carrier offset value further comprises:

detecting a mode indication symbol of the secondary baseband signal.

10. The method according to claim 9, wherein the step of determining whether to adjust the primary feedback signal and the secondary feedback signal further comprises:

calibrating the frequency of the transmission signal according to the known primary carrier frequency, the known secondary carrier frequency, the primary feedback signal and the secondary feedback signal to obtain a first calibrated primary baseband signal and a first calibrated secondary baseband signal;

if the mode indication symbol of the secondary baseband signal indicates that the secondary baseband signal is in a dual sound mode or a stereo sound mode, demodulating the first calibrated primary baseband signal and the first calibrated secondary baseband signal to obtain audio signals from the transmission signal;

if the mode indication symbol of the secondary baseband signal indicates that the secondary baseband signal is not in the dual sound mode or the stereo sound mode, calculating carrier power levels of the first calibrated primary baseband signal and the first calibrated secondary baseband signal;

comparing the carrier power level of the first calibrated primary baseband signal with the carrier power level of the first calibrated secondary baseband signal;

if the carrier power level of the first calibrated primary baseband signal is greater than the carrier power level of the first calibrated secondary baseband signal, not adjusting the primary feedback signal and the secondary feedback signal, and demodulating the first calibrated primary baseband signal and the first calibrated secondary baseband signal to obtain the audio signals from the transmission signal;

if the carrier power level of the first calibrated primary baseband signal is not greater than the carrier power level of the first calibrated secondary baseband signal, adjusting the primary feedback signal and the secondary feedback signal as the primary carrier offset value;

calibrating the frequency of the transmission signal according to the known primary carrier frequency, the known secondary carrier frequency, the primary feedback signal and the secondary feedback signal to obtain a second calibrated primary baseband signal and a second calibrated secondary baseband signal;

calculating carrier power levels of the second calibrated primary baseband signal and the second calibrated secondary baseband signal;

detecting a mode indication symbol of the second calibrated secondary baseband signal;

comparing the carrier power level of the second calibrated primary baseband signal with the carrier power level of the second calibrated secondary baseband signal;

if the mode indication symbol of the second calibrated secondary baseband signal indicates that the second calibrated secondary baseband signal is in the dual sound mode or the stereo sound mode, not adjusting the primary feedback signal and the secondary feedback signal, and demodulating the second calibrated primary baseband signal and the second calibrated secondary baseband signal to obtain the audio signals from the transmission signal;

if the mode indication symbol of the second calibrated secondary baseband signal indicates that the second calibrated secondary baseband signal is not in the dual sound mode or the stereo sound mode, but the carrier power level of the second calibrated primary baseband signal is greater than the carrier power level of the second calibrated secondary baseband signal, not adjusting the primary feedback signal and the secondary feedback signal, and demodulating the second calibrated primary baseband signal and the second calibrated secondary baseband signal to obtain the audio signals from the transmission signal; and if the mode indication symbol of the second calibrated secondary baseband signal indicates that the second calibrated secondary baseband signal is not in the dual sound mode or the stereo sound mode, and if the carrier power level of the second calibrated primary baseband signal is not greater than the carrier power level of the second calibrated secondary baseband signal, adjusting the primary feedback signal and the secondary feedback signal as 0.

11. The method according to claim 1, wherein the step of determining whether to adjust the primary feedback signal and the secondary feedback signal comprises:

if an absolute value of the primary carrier offset value or an absolute value of the secondary carrier offset value is not less than a frequency offset threshold, and if a sum of the primary carrier offset value and the known primary carrier frequency is substantially equal to a sum of the secondary carrier offset value and the known secondary carrier frequency, adjusting the primary feedback signal and the secondary feedback signal as the secondary carrier offset value.

12. The method according to claim 11, further comprising:

calibrating the frequency of the transmission signal according to the known primary carrier frequency, the known secondary carrier frequency, the primary feedback signal and the secondary feedback signal to obtain a first calibrated primary baseband signal and a first calibrated secondary baseband signal;

respectively calculating a signal to noise ratio (SNR) of each of the first calibrated primary baseband signal and the first calibrated secondary baseband signal;

if the SNR of the first calibrated primary baseband signal is greater than an SNR maximum threshold, not adjusting the primary feedback signal and the secondary feedback signal, and demodulating the first calibrated primary baseband signal and the first calibrated secondary baseband signal to obtain audio signals from the transmission signal;

if the SNR of the first calibrated primary baseband signal is less than an SNR minimum threshold, adjusting the primary feedback signal and the secondary feedback signal as the primary carrier offset value;

calibrating the frequency of the transmission signal according to the known primary carrier frequency, the known secondary carrier frequency, the primary feedback signal and the secondary feedback signal to obtain a second calibrated primary baseband signal and a second calibrated secondary baseband signal;

respectively calculating an SNR of each of the second calibrated primary baseband signal and the second calibrated secondary baseband signal;

if the SNR of the second calibrated secondary baseband signal is greater than the SNR maximum threshold, not adjusting the primary feedback signal and the secondary feedback signal, and demodulating the second calibrated primary baseband signal and the second calibrated secondary baseband signal to obtain the audio signals from the transmission signal; and if the SNR of the second calibrated secondary baseband signal is less than the SNR minimum threshold, adjusting the primary feedback signal and the secondary feedback signal as 0.

13. A carrier frequency offset calibration system, adapted to calibrate carrier frequency offsets of a transmission signal comprising a primary carrier and a secondary carrier, the system comprising:

a standard detector, configured to provide a known primary carrier frequency and a known secondary carrier frequency;

a primary demodulation apparatus, coupled to the standard detector and analyzing a frequency of the transmission signal according to the known primary carrier frequency and the primary feedback signal to obtain a primary carrier offset value;

a secondary demodulation apparatus, coupled to the standard detector and analyzing the frequency of the transmission signal according to the known secondary carrier frequency and the secondary feedback signal to obtain a secondary carrier offset value; and a carrier offset coordinator, coupled to the primary demodulation apparatus and the secondary demodulation apparatus to receive the primary carrier offset value and the secondary carrier offset value, wherein the carrier offset coordinator determines whether to adjust the primary feedback signal and the secondary feedback signal according to a relationship between the primary carrier offset value and the secondary carrier offset value, wherein the primary demodulation apparatus and the secondary demodulation apparatus respectively calibrate the frequency of the transmission signal according to the known primary carrier frequency, the primary feedback signal, the known secondary carrier frequency and the secondary feedback signal to obtain a primary baseband signal and a secondary baseband signal, respectively calculate the primary carrier offset value of the primary baseband signal and the secondary carrier offset value of the secondary baseband signal, and respectively calculate a carrier power level of the primary baseband signal and a carrier power level of the secondary baseband signal to the carrier offset coordinator, wherein if the carrier offset coordinator determines that an absolute value of the primary carrier offset value or an absolute value of the secondary carrier offset value is not less than a frequency offset threshold and a sum of the primary carrier offset value and the known primary carrier frequency is substantially equal to a sum of the secondary carrier offset value and the known secondary carrier frequency, the carrier offset coordinator adjusts the primary feedback signal and the secondary feedback signal as the secondary carrier offset value.

14. The system according to claim 13, wherein if determining that both an absolute value of the primary carrier offset value and an absolute value of the secondary carrier offset value are less than a frequency offset threshold, the carrier offset coordinator does not adjust the primary feedback signal and the secondary feedback signal, and the primary demodulation apparatus and the secondary demodulation apparatus respectively demodulate the transmission signal to obtain audio signals from the transmission signal.

15. The system according to claim 13, wherein if determining that an absolute value of the primary carrier offset value or an absolute value of the secondary carrier offset value is not less than a frequency offset threshold, and if a sum of the primary carrier offset value and the known primary carrier frequency is substantially equal to a sum of the secondary carrier offset value and the known secondary carrier frequency, the carrier offset coordinator examines whether a test primary carrier offset value and a test secondary carrier offset value are set initial values;

if the test primary carrier offset value and the test secondary carrier offset value are the set initial values, the carrier offset coordinator records the primary carrier offset value and the secondary carrier offset value as the test primary carrier offset value and the test secondary carrier offset value, and the carrier offset coordinator adjusts the primary feedback signal and the secondary feedback signal as one of the test primary carrier offset value and the test secondary carrier offset value according to a flag value; and if the test primary carrier offset value and the test secondary carrier offset value are not the set initial values, the carrier offset coordinator adjusts the primary feedback signal and the secondary feedback signal as one of the test primary carrier offset value and the test secondary carrier offset value according to the flag value.

16. The system according to claim 15, wherein if the flag value is 0, the carrier offset coordinator adjusts the primary feedback signal and the secondary feedback signal as one of the test primary carrier offset value and the test secondary carrier offset value and re-sets the flag value as 1; and if the flag value is 1, the carrier offset coordinator adjusts the primary feedback signal and the secondary feedback signal as the other of the test primary carrier offset value and the test secondary carrier offset value and re-sets the flag value as 0.

17. The system according to claim 13, wherein if determining that an absolute value of the primary carrier offset value or an absolute value of the secondary carrier offset value is not less than a frequency offset threshold, and a sum of the primary carrier offset value and the known primary carrier frequency is not substantially equal to a sum of the secondary carrier offset value and the known secondary carrier frequency, the carrier offset coordinator adjusts the primary feedback signal as the primary carrier offset value and adjusts the secondary feedback signal as the secondary carrier offset value, and the primary demodulation apparatus and the secondary demodulation apparatus demodulates the transmission signal to obtain audio signals from the transmission signal.

18. The system according to claim 13, wherein
the carrier offset coordinator compares the carrier power level of the primary baseband signal with the carrier power level of the secondary baseband signal; and
if determining that an absolute value of the primary carrier offset value or an absolute value of the secondary carrier offset value is not less than a frequency offset threshold, and a sum of the primary carrier offset value and the known primary carrier frequency is substantially equal to a sum of the secondary carrier offset value and the known secondary carrier frequency, and the carrier power level of the primary baseband signal is substantially equal to the carrier power level of the secondary baseband signal, the carrier offset coordinator adjusts the primary feedback signal and the secondary feedback signal as one of the primary carrier offset value and the secondary carrier offset value.

19. The system according to claim 18, wherein
the primary demodulation apparatus and the secondary demodulation apparatus respectively calibrate the frequency of the transmission signal according to the known primary carrier frequency and the primary feedback signal, the known secondary carrier frequency and the secondary feedback signal to obtain a first calibrated primary baseband signal and a first calibrated secondary baseband signal;
the primary power calculator and the secondary power calculator respectively calculate a carrier power level of the first calibrated primary baseband signal and a carrier power level of the first calibrated secondary baseband signal to the carrier offset coordinator;
the carrier offset coordinator compares the carrier power level of the first calibrated primary baseband signal with the carrier power level of the first calibrated secondary baseband signal;
if the carrier offset coordinator determines that the carrier power level of the first calibrated primary baseband signal is greater than the carrier power level of the first calibrated secondary baseband signal, the primary demodulation apparatus and the secondary demodulation apparatus respectively demodulate the first calibrated primary baseband signal and the first calibrated secondary baseband signal to obtain audio signals from the transmission signal;
if determining that the carrier power level of the first calibrated primary baseband signal is not greater than the carrier power level of the first calibrated secondary baseband signal, the carrier offset coordinator adjusts the primary feedback signal and the secondary feedback signal as the other of the primary carrier offset value and the secondary carrier offset value;
the primary demodulation apparatus and the secondary demodulation apparatus respectively calibrate again the frequency of the transmission signal according to the known primary carrier frequency and the primary feedback signal, the known secondary carrier frequency and the secondary feedback signal to obtain a second calibrated primary baseband signal and a second calibrated secondary baseband signal;
the primary power calculator and the secondary power calculator respectively calculate a carrier power level of the second calibrated primary baseband signal and a carrier power level of the second calibrated secondary baseband signal to the carrier offset coordinator;

the carrier offset coordinator compares the carrier power level of the second calibrated primary baseband signal with the carrier power level of the second calibrated secondary baseband signal;
if the carrier offset coordinator determines that the carrier power level of the second calibrated primary baseband signal is greater than the carrier power level of the second calibrated secondary baseband signal, the primary demodulation apparatus and the secondary demodulation apparatus respectively demodulate the second calibrated primary baseband signal and the second calibrated secondary baseband signal to obtain the audio signals from the transmission signal; and
if determining that the carrier power level of the second calibrated primary baseband signal is not greater than the carrier power level of the second calibrated secondary baseband signal, the carrier offset coordinator adjusts the primary feedback signal and the secondary feedback signal as 0.

20. The system according to claim 13, wherein
the secondary demodulation apparatus further comprises a mode detector;
the primary demodulation apparatus and the secondary demodulation apparatus further respectively calibrate the frequency of the transmission signal according to the known primary carrier frequency and the primary feedback signal, the known secondary carrier frequency and the secondary feedback signal to obtain a first calibrated primary baseband signal and a first calibrated secondary baseband signal;
the primary power calculator and the secondary power calculator respectively calculate a carrier power level of the first calibrated primary baseband signal and a carrier power level of the first calibrated secondary baseband signal to the carrier offset coordinator;
the secondary demodulation apparatus detects a mode indication symbol of the first calibrated secondary baseband signal using the mode detector;
the carrier offset coordinator compares the carrier power level of the first calibrated primary baseband signal with the carrier power level of the first calibrated secondary baseband signal;
if determining that the mode indication symbol of the first calibrated secondary baseband signal indicates that the first calibrated secondary baseband signal is in a dual sound mode or a stereo sound mode, the carrier offset coordinator does not adjust the primary feedback signal and the secondary feedback signal, and the primary demodulation apparatus and the secondary demodulation apparatus demodulate the first calibrated primary baseband signal and the first calibrated secondary baseband signal to obtain audio signals from the transmission signal;
if determining that the mode indication symbol of the first calibrated secondary baseband signal indicates that the first calibrated secondary baseband signal is not in the dual sound mode or the stereo sound mode, but the carrier power level of the first calibrated primary baseband signal is greater than the carrier power level of the first calibrated secondary baseband signal, the carrier offset coordinator does not adjust the primary feedback signal and the secondary feedback signal, and the primary demodulation apparatus and the secondary demodulation apparatus demodulate the first calibrated primary baseband signal and the first calibrated secondary baseband signal to obtain the audio signal from the transmission signal;

if determining that the mode indication symbol of the first calibrated secondary baseband signal indicated that the first calibrated secondary baseband signal is not in the dual sound mode or the stereo sound mode, and the carrier power level of the first calibrated primary baseband signal is not greater than the carrier power level of the first calibrated secondary baseband signal, the carrier offset coordinator adjusts the primary feedback signal and the secondary feedback signal as the primary carrier offset value;

the primary demodulation apparatus and the secondary demodulation apparatus respectively calibrate again the frequency of the transmission signal according to the known primary carrier frequency and the primary feedback signal, the known secondary carrier frequency and the secondary feedback signal to obtain a second calibrated primary baseband signal and a second calibrated secondary baseband signal;

the primary power calculator and the secondary power calculator respectively calculate a carrier power level of the second calibrated primary baseband signal and a carrier power level of the second calibrated secondary baseband signal to the carrier offset coordinator;

the secondary demodulation apparatus detects a mode indication symbol of the second calibrated secondary baseband signal using the mode detector;

the carrier offset coordinator compares the carrier power level of the second calibrated primary baseband signal with the carrier power level of the second calibrated secondary baseband signal;

if determining that the mode indication symbol of the second calibrated secondary baseband signal indicates that the second calibrated secondary baseband signal is in the dual sound mode or the stereo sound mode, the carrier offset coordinator does not adjust the primary feedback signal and the secondary feedback signal, and the primary demodulation apparatus and the secondary demodulation apparatus demodulate the second calibrated primary baseband signal and the second calibrated secondary baseband signal to obtain the audio signals from the transmission signal;

if determining that the mode indication symbol of the second calibrated secondary baseband signal indicates that the second calibrated secondary baseband signal is not in the dual sound mode or the stereo sound mode, but the carrier power level of the second calibrated primary baseband signal is greater than the carrier power level of the second calibrated secondary baseband signal, the carrier offset coordinator does not adjust the primary feedback signal and the secondary feedback signal, and the primary demodulation apparatus and the secondary demodulation apparatus demodulate the second calibrated primary baseband signal and the second calibrated secondary baseband signal to obtain the audio signals from the transmission signal; and if determining that the mode indication symbol of the second calibrated secondary baseband signal indicates that the second calibrated secondary baseband signal is not in the dual sound mode or the stereo sound mode, and the carrier power level of the second calibrated primary baseband signal is not greater than the carrier power level of the second calibrated secondary baseband signal, the carrier offset coordinator adjusts the primary feedback signal and the secondary feedback signal as 0.

21. The system according to claim 13, wherein the secondary demodulation apparatus further comprises a mode detector configured to detect a mode indication symbol of the secondary baseband signal.

22. The system according to claim 21, wherein
the primary demodulation apparatus and the secondary demodulation apparatus further respectively calibrate the frequency of the transmission signal according to the known primary carrier frequency and the primary feedback signal, the known secondary carrier frequency and the secondary feedback signal to obtain a first calibrated primary baseband signal and a first calibrated secondary baseband signal;

if the carrier offset coordinator determines that the mode indication symbol of the secondary baseband signal indicates that the secondary baseband signal is in the dual sound mode or the stereo sound mode, the primary demodulation apparatus and the secondary demodulation apparatus demodulate the first calibrated primary baseband signal and the first calibrated secondary baseband signal to obtain audio signals from the transmission signal;

if determining that the mode indication symbol of the secondary baseband signal indicates that the secondary baseband signal is not in the dual sound mode or the stereo sound mode, the primary power calculator and the secondary power calculator respectively calculate a carrier power level of the first calibrated primary baseband signal and a carrier power level of the first calibrated secondary baseband signal to the carrier offset coordinator;

the carrier offset coordinator compares the carrier power level of the first calibrated primary baseband signal with the carrier power level of the first calibrated secondary baseband signal;

if determine that the carrier power level of the first calibrated primary baseband signal is greater than the carrier power level of the first calibrated secondary baseband signal, the carrier offset coordinator does not adjust the primary feedback signal and the secondary feedback signal, and the primary demodulation apparatus and the secondary demodulation apparatus demodulate the first calibrated primary baseband signal and the first calibrated secondary baseband signal to obtain the audio signals from the transmission signal;

if determining that the carrier power level of the first calibrated primary baseband signal is not greater than the carrier power level of the first calibrated secondary baseband signal, the carrier offset coordinator adjusts the primary feedback signal and the secondary feedback signal as the primary carrier offset value;

the primary demodulation apparatus and the secondary demodulation apparatus respectively calibrate the frequency of the transmission signal according to the known primary carrier frequency and the primary feedback signal, the known secondary carrier frequency and the secondary feedback signal to obtain a second calibrated primary baseband signal and a second calibrated secondary baseband signal;

the primary power calculator and the secondary power calculator respectively calculate a carrier power level of the second calibrated primary baseband signal and a carrier power level of the second calibrated secondary baseband signal to the carrier offset coordinator;

the mode detector detects a mode indication symbol of the second calibrated secondary baseband signal;

the carrier offset coordinator further compares the carrier power level of the second calibrated primary baseband signal with the carrier power level of the second calibrated secondary baseband signal;

if determining that the mode indication symbol of the second calibrated secondary baseband signal indicates that the second calibrated secondary baseband signal is in the dual sound mode or the stereo sound mode, the carrier offset coordinator does not adjust the primary feedback signal and the secondary feedback signal, and the primary demodulation apparatus and the secondary demodulation apparatus demodulate the second calibrated primary baseband signal and the second calibrated secondary baseband signal to obtain the audio signals from the transmission signal;

if determining that the mode indication symbol of the second calibrated secondary baseband signal indicates that the second calibrated secondary baseband signal is not in the dual sound mode or the stereo sound mode, but the carrier power level of the second calibrated primary baseband signal is greater than the carrier power level of the second calibrated secondary baseband signal, the carrier offset coordinator does not adjust the primary feedback signal and the secondary feedback signal, and the primary demodulation apparatus and the secondary demodulation apparatus demodulate the second calibrated primary baseband signal and the second calibrated secondary baseband signal to obtain the audio signals from the transmission signal; and if determining that the mode indication symbol of the second calibrated secondary baseband signal indicates that the second calibrated secondary baseband signal is not in the dual sound mode or the stereo sound mode, and the carrier power level of the second calibrated primary baseband signal is not greater than the carrier power level of the second calibrated secondary baseband signal, the carrier offset coordinator adjusts the primary feedback signal and the secondary feedback signal as 0.

23. The system according to claim 13, wherein
if determining that an absolute value of the primary carrier offset value or an absolute value of the secondary carrier offset value is not less than a frequency offset threshold, and a sum of the primary carrier offset value and the known primary carrier frequency is substantially equal to a sum of the secondary carrier offset value and the known secondary carrier frequency, the carrier offset coordinator adjusts the primary feedback signal and the secondary feedback signal as the secondary carrier offset value.

24. The system according to claim 23, wherein
the primary demodulation apparatus further comprise a primary carrier quality meter and the secondary demodulation apparatus further comprise a secondary carrier quality mete;

the primary demodulation apparatus and the secondary demodulation apparatus respectively calibrate the frequency of the transmission signal according to the known primary carrier frequency and the primary feedback signal, the known secondary carrier frequency and the secondary feedback signal to obtain a first calibrated primary baseband signal and a first calibrated secondary baseband signal;

the primary carrier quality meter and the secondary carrier quality meter respectively calculate an SNR of the first calibrated primary baseband signal and an SNR of the first calibrated secondary baseband signal to the carrier offset coordinator;

if determining that the SNR of the first calibrated primary baseband signal is greater than an SNR maximum threshold, the carrier offset coordinator does not adjust the primary feedback signal and the secondary feedback signal, and the primary demodulation apparatus and the secondary demodulation apparatus demodulate the first calibrated primary baseband signal and the first calibrated secondary baseband signal to obtain audio signals from the transmission signal;

if determining that the SNR of the first calibrated primary baseband signal is less than an SNR minimum threshold, the carrier offset coordinator adjusts the primary feedback signal and the secondary feedback signal as the primary carrier offset value;

the primary demodulation apparatus and the secondary demodulation apparatus respectively calibrate again the frequency of the transmission signal according to the known primary carrier frequency and the primary feedback signal, the known secondary carrier frequency and the secondary feedback signal to obtain a second calibrated primary baseband signal and a second calibrated secondary baseband signal;

the primary carrier quality meter and the secondary carrier quality meter respectively calculate an SNR of the second calibrated primary baseband signal and an SNR of the second calibrated secondary baseband signal to the carrier offset coordinator;

if determining that the SNR of the second calibrated secondary baseband signal is greater than the SNR maximum threshold, the carrier offset coordinator does not adjust the primary feedback signal and the secondary feedback signal, and the primary demodulation apparatus and the secondary demodulation apparatus demodulate the second calibrated primary baseband signal and the second calibrated secondary baseband signal to obtain the audio signals from the transmission signal; and if determining that the SNR of the second calibrated secondary baseband signal is less than an SNR minimum threshold, the carrier offset coordinator adjusts the primary feedback signal and the secondary feedback signal as 0.

* * * * *